United States Patent
Kim et al.

(10) Patent No.: US 10,879,967 B2
(45) Date of Patent: Dec. 29, 2020

(54) DEVICE AND METHOD FOR TRANSMITTING AND RECEIVING FEEDBACK INFORMATION IN WIRELESS COMMUNICATION SYSTEM

(71) Applicant: Samsung Electronics Co., Ltd., Suwon-si (KR)

(72) Inventors: Jung Ju Kim, Incheon (KR); Yongseok Kim, Suwon-si (KR); Hyunyong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/577,310

(22) PCT Filed: May 25, 2016

(86) PCT No.: PCT/KR2016/005503
§ 371 (c)(1),
(2) Date: Nov. 27, 2017

(87) PCT Pub. No.: WO2016/190653
PCT Pub. Date: Dec. 1, 2016

(65) Prior Publication Data
US 2018/0159600 A1    Jun. 7, 2018

(30) Foreign Application Priority Data

May 27, 2015 (KR) .................. 10-2015-0074151

(51) Int. Cl.
*H04B 7/02* (2018.01)
*H04B 7/0426* (2017.01)
(Continued)

(52) U.S. Cl.
CPC .......... *H04B 7/043* (2013.01); *H04B 7/0421* (2013.01); *H04B 7/066* (2013.01); *H04B 7/0617* (2013.01);
(Continued)

(58) Field of Classification Search
CPC ........ H04B 7/043; H04B 7/082; H04B 7/066; H04B 7/0641; H04B 7/0421; H04B 7/0617; H04B 7/088; H04B 7/0695; H04B 7/0658
(Continued)

(56) References Cited

U.S. PATENT DOCUMENTS

2008/0051150 A1    2/2008  Tsutsui
2013/0039345 A1*   2/2013  Kim .................. H04W 72/046
                                                  370/332
(Continued)

FOREIGN PATENT DOCUMENTS

KR    10-2013-0017932 A    2/2013
KR    10-2015-0035639 A    4/2015

OTHER PUBLICATIONS

Foreign Communication from Related Counterpart Application; European Patent Application No. 16800292.1; Extended European Search Report and European Search Opinion dated May 30, 2018; 7 pages.

(Continued)

*Primary Examiner* — Dhaval V Patel

(57) ABSTRACT

Disclosed is a 5th generation (5G) or pre-5G communication system to be provided for supporting a data transmission rate higher than that of a 4th generation (4G) communication system such as long term evolution (LTE). Examples of the present invention provide a beam selection and feedback device and method for minimizing complexity and overhead without performance deterioration in a beamforming MIMO (Continued)

wireless communication system. According to one example of the present invention, an apparatus of a receiving device in a wireless communication system comprises: a transceiver; and at least one processor, wherein the at least one processor is configured to: select at least one beam pair from among a plurality of transmission/reception beam pairs, and control the transceiver to transmit feedback information including indication information indicating whether the at least one beam pair is identical to a beam pair selected in a previous beamforming procedure.

20 Claims, 26 Drawing Sheets

(51) Int. Cl.
　　*H04B 7/06* 　　(2006.01)
　　*H04B 7/08* 　　(2006.01)
　　*H04B 7/0417* 　　(2017.01)
(52) U.S. Cl.
　　CPC ......... *H04B 7/0641* (2013.01); *H04B 7/0658* (2013.01); *H04B 7/0695* (2013.01); *H04B 7/082* (2013.01); *H04B 7/088* (2013.01)
(58) Field of Classification Search
　　USPC ........................................................ 375/267
　　See application file for complete search history.

(56) References Cited

U.S. PATENT DOCUMENTS

| | | |
|---|---|---|
| 2013/0072243 A1 | 3/2013 | Yu et al. |
| 2013/0231059 A1 | 9/2013 | Prasad et al. |
| 2013/0301454 A1 | 11/2013 | Seol et al. |
| 2013/0343211 A1* | 12/2013 | Liu ..................... H04L 25/0204 370/252 |
| 2014/0307654 A1 | 10/2014 | Kim |
| 2016/0241322 A1 | 8/2016 | Son et al. |
| 2018/0192438 A1* | 7/2018 | Wilson ................. H04B 7/0695 |

OTHER PUBLICATIONS

ISA/KR, "International Search Report," Application No. PCT/KR2016/005503, dated Sep. 6, 2016, 3 pages.
ISA/KR, "Written Opinion of the International Searching Authority," Application No. PCT/KR2016/005503, dated Sep. 6, 2016, 7 pages.
IEEE Std 802.11ad-2012, (Amendment to IEEE Std 802.11-2012, as amended by IEEE Std 802.11ae-2012 and IEEE Std 802.11aa-2012), Part 11: Wireless LAN Medium Access Control (MAC) and Physical Layer (PHY) Specifications, Amendment 3: Enhancements for Very High Throughput in the 60 GHz Band, IEEE Standard for Information technology—Telecommunications and information exchange between systems, Local and metropolitan area networks—Specific requirements, IEEE Computer Society, IEEE New York, NY, Dec. 20, 2012. 628 pages.
Communication pursuant to Article 94(3) EPC in connection with European Application No. 16800292.1 dated Jul. 15, 2020, 5 pages.

* cited by examiner

Diff. Threshold
(Threshold value)

| Diff. Threshold | Value |
|---|---|
| 000 | 0.5 |
| 001 | 1 |
| 010 | 1.5 |
| 011 | 2 |
| 100 | 2.5 |
| 101 | 3 |
| 110 | 3.5 |
| 111 | 4 |

→ Omit calculation of CQI and feedback thereof when difference in channel capacities is less than or equal to 2

FIG.12

DEVICE AND METHOD FOR TRANSMITTING AND RECEIVING FEEDBACK INFORMATION IN WIRELESS COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/005503 filed May 25, 2016, which claims the benefit of Korean Patent Application No. 10-2015-0074151 filed May 27, 2015, the disclosures of which are fully incorporated herein by reference into the present disclosure as if fully set forth herein.

TECHNICAL FIELD

The present disclosure relates to transmission and reception of feedback information in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system (hereinafter referred to as a 'beamforming MIMO wireless communication system') that supports beamforming and Multiple-Input Multiple-Output (MIMO), a best beam combination is selected and information on the best beam combination is fed back. Here, the beam combination may indicate a pair of a transmission beam and a reception beam. Complexity needs to be minimized without performance deterioration when an operation of selecting the best beam combination is performed and overhead attributable to feedback of the best beam combination needs to be reduced.

SUMMARY

Therefore, the present disclosure has been made in view of the above-mentioned problems, and an aspect of the present disclosure is to provide a method and device for reducing complexity without performance deterioration when selecting a best beam combination is performed in a beamforming MIMO wireless communication system.

Another aspect of the present disclosure is to provide a method and device for reducing overhead attributable to feedback of the result of selecting a best beam combination in a beamforming MIMO wireless communication system.

Another aspect of the present disclosure is to provide a method and device for a beam selection and feedback method and device, which minimize complexity and overhead without performance deterioration in a beamforming MIMO wireless communication system.

In accordance with an aspect of the present disclosure, there is provided a method for operating a receiving device in a wireless communication system, the method including: selecting at least one beam combination from among a plurality of transmission/reception beam combinations; and transmitting feedback information including indication information indicating whether the at least one beam combination is identical to a previous best beam combination.

In accordance with another aspect of the present disclosure, there is provided a method for operating a transmitting device in a wireless communication system, the method including: receiving feedback information including indication information indicating whether at least one beam combination selected from among a plurality of transmission/reception beam combinations is identical to a previous best beam combination.

In accordance with an aspect of the present disclosure, there is provided an apparatus of a receiving device in a wireless communication system, the apparatus including: a controller to select at least one beam combination from among a plurality of transmission/reception beam combinations; and a transmitter to transmit feedback information including indication information indicating whether the at least one beam combination is identical to a previous best beam combination.

In accordance with another aspect of the present disclosure, there is provided an apparatus of a transmitting device in a wireless communication system, the apparatus including: a receiver to receive feedback information including indication information indicating whether at least one beam combination selected from among a plurality of transmission/reception beam combinations is identical to a previous best beam combination.

According to embodiments of the present disclosure, complexity and feedback information processing calculation time is minimized by setting candidates and performing comparison with an existing best beam when an operation of selecting a best beam that maximizes channel capacity is performed. Also, according to embodiments of the present disclosure, overhead is minimized by setting a flag bit for a beam number, and feeding back only 1-flag bit when an existing beam is reused, instead of transmitting beam numbers of each antenna. Also, according to embodiments of the present disclosure, inter-beam handover is performed in an immediately subsequent frame or subframe while latency time for scheduling such as beam/resource allocation or the like is minimized even in the situation in which a wireless beamforming MIMO system having mobility, that is, a channel, promptly changes, whereby performance deterioration of a radio communication link can be avoided, and a stable data rate can be provided to a terminal. Also, as the number of antennas in the transmission and reception sides increases, and the number of terminals within a cell increases, the amount of feedback information on a beam number increases. However, embodiments of the present disclosure can minimize feedback overhead depending on situations, and may be applied to the currently used WiGig (IEEE 802.11ad) standard without a significant modification.

BRIEF DESCRIPTION OF THE DRAWINGS

For complete understanding of the present disclosure and effects thereof, descriptions will now be made with reference to the accompanying drawings, wherein like reference numerals refer to the like elements throughout.

FIG. 12 is a diagram illustrating an example of setting a threshold value according to an embodiment of the present disclosure;

DETAILED DESCRIPTION

Hereinafter, embodiments of the present disclosure will be described in detail with reference to the accompanying drawings. In the following description, it should be noted that only portions required for comprehension of operations according to the embodiments of the present disclosure will be described and descriptions of other portions will be omitted not to make subject matters of the present disclosure obscure. The terms which will be described below are terms defined in consideration of the functions in the present disclosure, and may be different according to users, intentions of the users, or customs. Therefore, the terms should be defined on the basis of the contents throughout the specification.

The present disclosure may have various modifications and various embodiments, among which specific embodiments will now be described more fully with reference to the accompanying drawings. However, it should be understood that the present disclosure is not limited to the specific embodiments, but the present disclosure includes all modifications, equivalents, and alternatives within the spirit and the scope of the present disclosure. Accordingly, in this patent specification, FIGS. 1 to 17 used for describing the principles of the present disclosure are merely for examples and should not be construed to limit the scope of the present disclosure.

Embodiments of the present disclosure hereinafter described relate to a method and device for efficient beam selection and feedback, which minimizes complexity of a best beam combination selection without performance deterioration, and minimizes feedback overhead in a wireless communication system.

Figure 1:
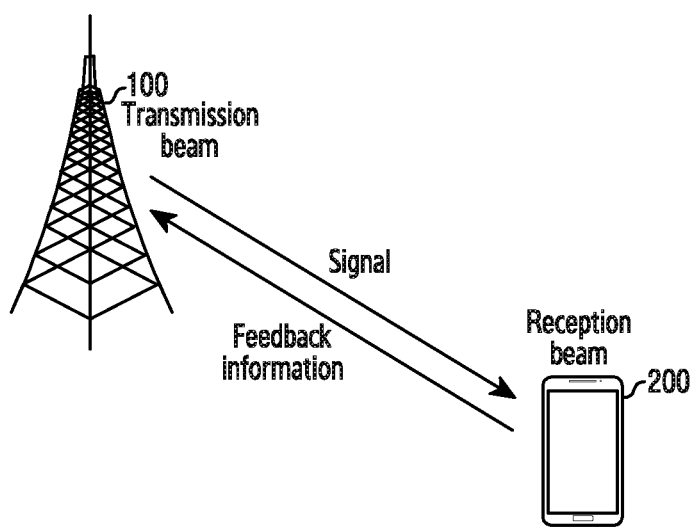
FIG. 1 is a diagram illustrating the concept of an operation of transmitting and receiving feedback information in a wireless communication system to which embodiments of the present disclosure are applied.

FIG. 1 is a diagram illustrating the concept of an operation of transmitting and receiving feedback information in a wireless communication system to which embodiments of the present disclosure are applied.

Referring to FIG. 1, a base station 100 and a terminal 200 may support beamforming. For example, the base station 100 may transmit a signal using a transmission beam, and the terminal 200 may receive the signal using a reception beam. Here, each of the base station 100 and the terminal 200 may include a plurality of antennas. The base station 100 may support a plurality of transmission beams for each antenna. Similarly, the terminal 200 may support a plurality of reception beams for each antenna. The terminal 200 may receive a signal from the base station 100, and may select a best combination of a transmission beam and a reception beam. Subsequently, the terminal 200 may feed back information on the selected best beam combination to the base station 100.

A representative method of selecting a best beam combination in a beamforming system may calculate channel capacities of all beam combinations, and select a beam combination for a base station and a terminal, which has the maximum channel capacity. However, calculating channel capacities with respect to all beam combinations is inappropriate for, particularly, a beamforming MIMO system. As the number of antennas increases and the number of beams for each antenna increases in the beamforming MIMO system, complexity and processing time significantly increases, and thus, sub-optimal methods are used to reduce the complexity and processing time. For example, as the sub-optimal methods, a method of reusing an existing power measurement value or a method of simplifying a channel capacity equation may be used. Information on a beam combination between antennas of a base station and a terminal (e.g., a beam number or index) obtained through the above method may be fed back to the base station by a determined period.

Figure 2A:
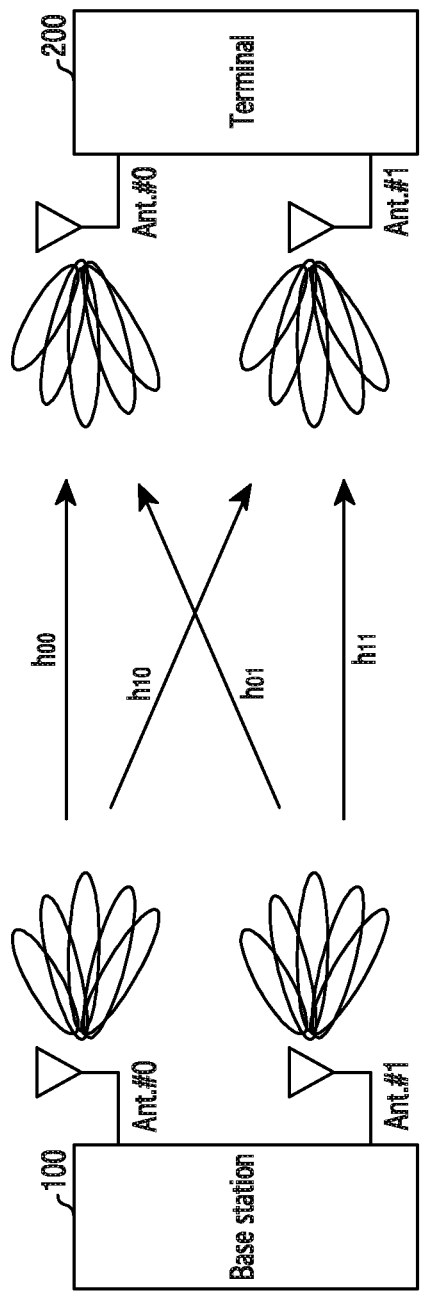
FIG. 2A is a diagram illustrating a beamforming MIMO system to which embodiments of the present disclosure are applied.
Figure 2B:
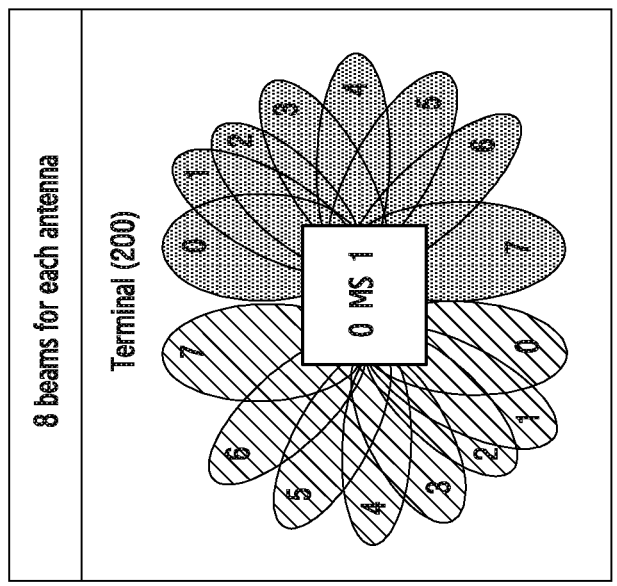
FIG. 2B is a diagram illustrating that a plurality of beam combinations are supported for each antenna by a base station and a terminal in a beamforming MIMO system to which embodiments of the present disclosure are applied.
Figure 2B:
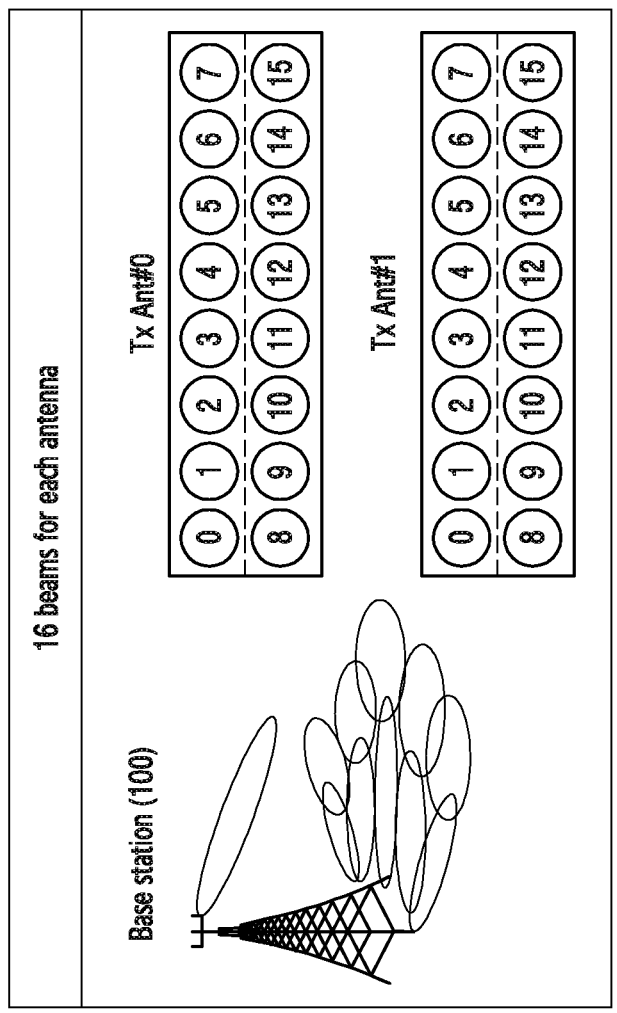

FIG. 2A is a diagram illustrating a beamforming MIMO system to which embodiments of the present disclosure are applied. FIG. 2B is a diagram illustrating that a plurality of beam combinations are supported for each antenna by a base station and a terminal in a beamforming MIMO system to which embodiments of the present disclosure are applied.

Referring to FIG. 2A, the bases station 100 includes two antennas Ant.#0 and Ant.#1. The terminal 200 includes two antennas Ant.#0 and Ant.#1. The antenna Ant.#0 of the terminal 200 receives a signal from the antenna Ant.#0 of the base station 100 through channel h00. The antenna Ant.#0 of the terminal 200 receives a signal from the antenna Ant.#1 of the base station 100 through channel h01. The antenna Ant.#1 of the terminal 200 receives a signal from the antenna Ant.#0 of the base station 100 through channel h10. The antenna Ant.#1 of the terminal 200 receives a signal from the antenna Ant.#1 of the base station 100 through channel h11. As described above, the base station 100 and the terminal 200 may configure a 2×2 MIMO system.

As illustrated in FIG. 2B, when it is assumed that the number of beams for each antenna of a transmission side (e.g., the base station 100) is 16 and the number of beams for each antenna of a reception side (e.g., the terminal 200) is 8, measurement, calculation, selection, and feedback operations may be performed with respect to 16,834 (=16×16× 8×8) beam combinations in the beamforming 2×2 MIMO system of FIG. 2A. As the number of antennas and the number of beams in the system increases, complexity of calculation and selection and processing time increases. In order to reduce the complexity and processing time, the sub-optimal beam selection and feedback methods, such as the method of reusing an existing power measurement value and the method of simplifying a channel capacity equation may be used as described above.

However, the sub-optimal beam selection and feedback methods may be inappropriate for a mobile radio environment varying rapidly. For the use in an immediately subsequent frame or subframe, a best beam needs to be selected and resource allocation or the like needs to be determined in the mobile radio environment. However, the sub-optimal beam selection and feedback methods have high complexity and take long processing time when selecting a best beam. Accordingly, the sub-optimal beam selection and feedback methods may deteriorate the performance of a radio communication link and may reduce an overall data rate.

The reception side (e.g., a terminal) of the beamforming MIMO system selects a beam through the sub-optimal beam selection and feedback methods, and periodically transmits information (e.g., number or index) on the selected beam for each antenna to the transmission side (e.g., a base station) as feedback information including a predetermined amount of feedback information. The feedback method may cause unnecessary feedback overhead, and may increase complexity and processing time associated with feedback information processing.

Embodiments of the present disclosure hereinafter described provide a beam selection/feedback method and device, which minimize complexity of beam selection, feedback information processing time, and overhead associated with the amount of feedback information, without performance deterioration.

In a beamforming MIMO system to which embodiments of the present disclosure are applied, a best beam for each antenna of a base station and a terminal may be changed due to an exterior factor, such as movement of the terminal, a channel environment, or the like. For the reasons, information on a best beam for each antenna of the base station and the terminal is periodically transmitted in the beamforming MIMO system. The terminal selects a best transmission/ reception beam combination through measurement, and feeds back information on the selection result to the base station. The processing is performed so as to continuously provide a service of good quality when inter-beam handover is performed, by periodically measuring a beam between the base station and the terminal, always selecting a best beam, and applying the best beam.

Figure 3:
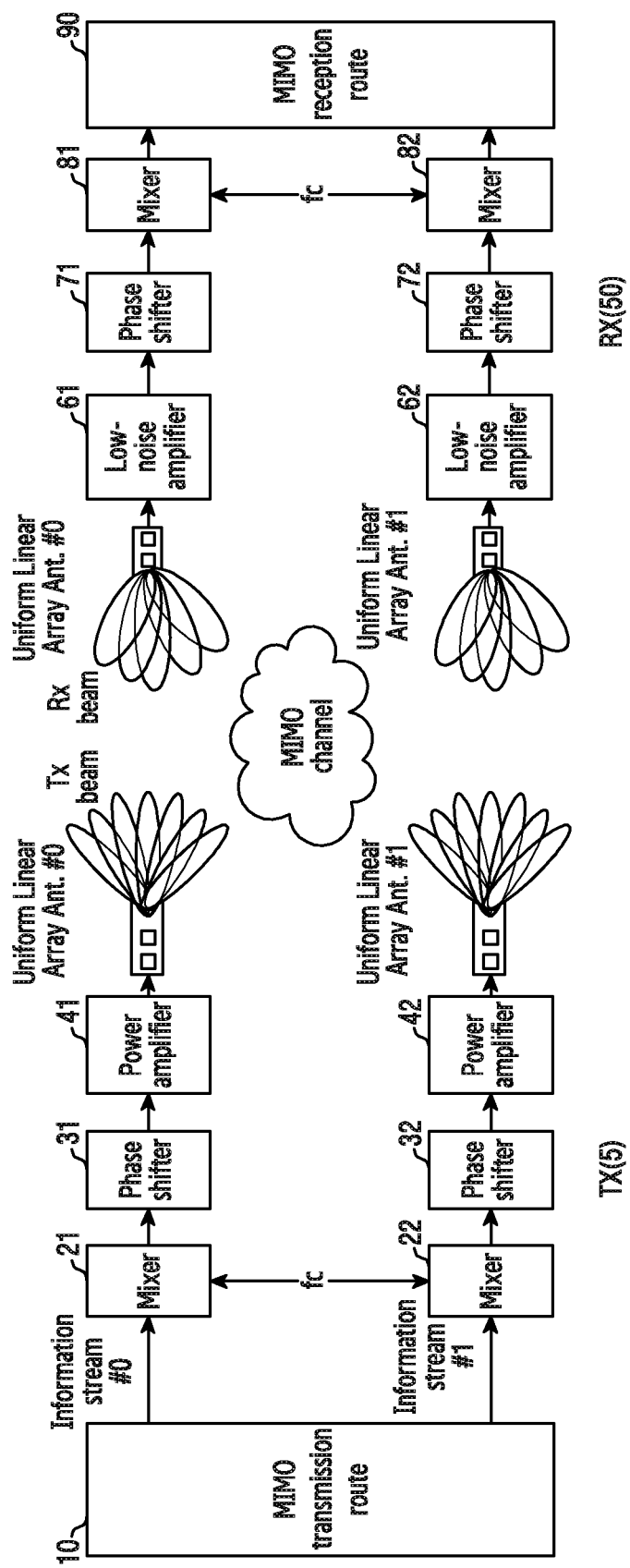
FIG. 3 is a diagram illustrating the basic structure of a beamforming MIMO system to which embodiments of the present disclosure are applied.
Figure 4:
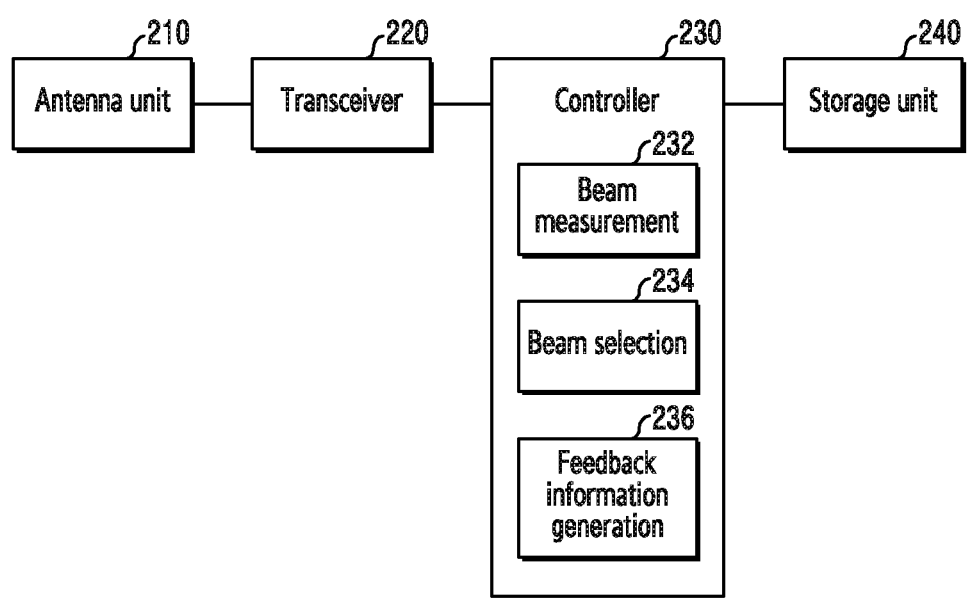
FIG. 4 is a diagram illustrating the configuration of a receiving device of a beamforming MIMO system to which embodiments of the present disclosure are applied.
Figure 5:
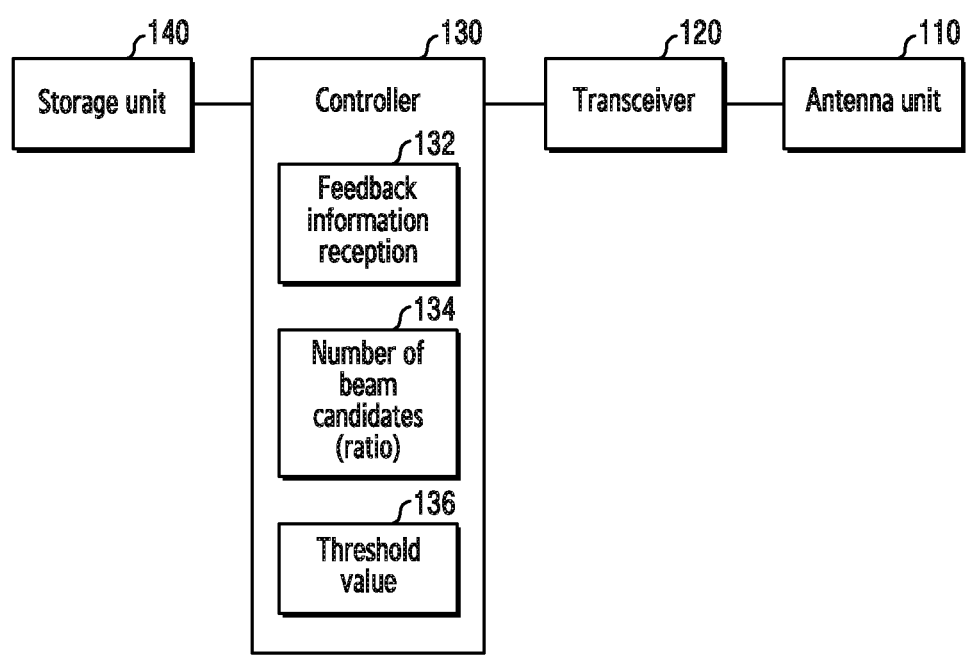
FIG. 5 is a diagram illustrating the configuration of a transmitting device of a beamforming MIMO system to which embodiments of the present disclosure are applied.

Hereinafter, the basic structure (prototype) of the beamforming MIMO system to which embodiments of the present disclosure are applied will be described first (FIG. 3). Subsequently, a transmitting device (e.g., a terminal device) and a receiving device (e.g., a base station device) of the beamforming MIMO system to which embodiments of the present disclosure are applied will be described (FIGS. 4 and 5). Next, examples of beam selection and feedback operations according to embodiments of the present disclosure will be described (FIGS. 6A to 9, and FIG. 11). Subsequently, information transmitted and received between a transmission side (e.g., a base station) and a reception side (e.g., a terminal) of the beamforming MIMO system for beam selection and feedback operations according to embodiments of the present disclosure will be described (FIGS. 12 to 17b).

According to embodiments of the present disclosure, a periodic best beam selection method in the beamforming MIMO system includes: setting beam candidates; selecting a beam based on a threshold value; minimizing the calculation (processing time) of a plurality of beam combinations; and simplifying the amount of feedback information.

A comparative analysis of beam selection results obtained based on power sum-based or channel capacity-based actual beam measurement results in the beamforming MIMO system will be described with reference to FIGS. 10A to 10D, in advance of describing embodiments of the present disclosure. The measurement operation for beam selection is performed in the beamforming 2×2 MIMO system as illustrated in FIG. 2A. The base station 100 includes two antennas, and each antenna supports 16 beams. The terminal 200 includes two antennas that support 360 degrees (°), and each antenna supports 8 beams.

First, the principal of selecting a beam based on a power sum will be described.

A method of selecting a best beam by comparing direct and cross power sums and a method of selecting a best beam based on a total power sum may be used to select a best beam. The difference between the former method and the latter method is negligible, and thus, the best beam is selected and analyzed through the latter method. All beam combinations within 2% based on the maximum power value are analyzed. The total power sum may be calculated by Equation 1 provided below.

$$PowerSum_{btx0,btx1,brx0,brx1} = \sum_{r=0}^{1} \sum_{t=0}^{1} \sum_{m=0}^{M-1} |Y_{n,t,r}|^2 \quad \text{Equation 1}$$

Here, btx0 denotes a beam index of transmission antenna #0. btx1 denotes a beam index of transmission antenna #1. brx0 denotes a beam index of reception antenna #0. brx1 denotes a beam index of reception antenna #1. r denotes a reception antenna index. t denotes a transmission antenna index. m denotes a used subcarrier index. Yn denotes a frequency domain sequence that uses 1024-point fast Fourier transform (FFT).

Subsequently, the principal of selecting a beam based on a channel capacity will be described.

A MIMO channel capacity is analyzed after a noise variance for each antenna is applied. All beam combinations within 2% based on the maximum channel capacity value are analyzed. A channel capacity value may be calculated by Equation 2 provided below.

$$Capacity_{btx0,btx1,brx0,brx1} = \\ \log_2\left(\det\left[I + \begin{bmatrix} \sigma_0^{-1} & 0 \\ 0 & \sigma_1^{-1} \end{bmatrix} H \left(\begin{bmatrix} \sigma_0^{-1} & 0 \\ 0 & \sigma_1^{-1} \end{bmatrix} H\right)^H\right]\right) \quad \text{Equation 2}$$

Here, btx0 denotes a beam index of transmission antenna #0. btx1 denotes a beam index of transmission antenna #1. brx0 denotes a beam index of reception antenna #0. brx1 denotes a beam index of reception antenna #1. I denotes an identity matrix. H denotes a channel matrix formed between a base station and a terminal, that is, a channel estimation value in the frequency domain. $\sigma_0^2$ denotes a noise variance of reception antenna #0 in a receive/transmit transition gap (RTG). $\sigma_1^2$ denotes a noise variance of reception antenna #1 in RTG.

Figure 10A:
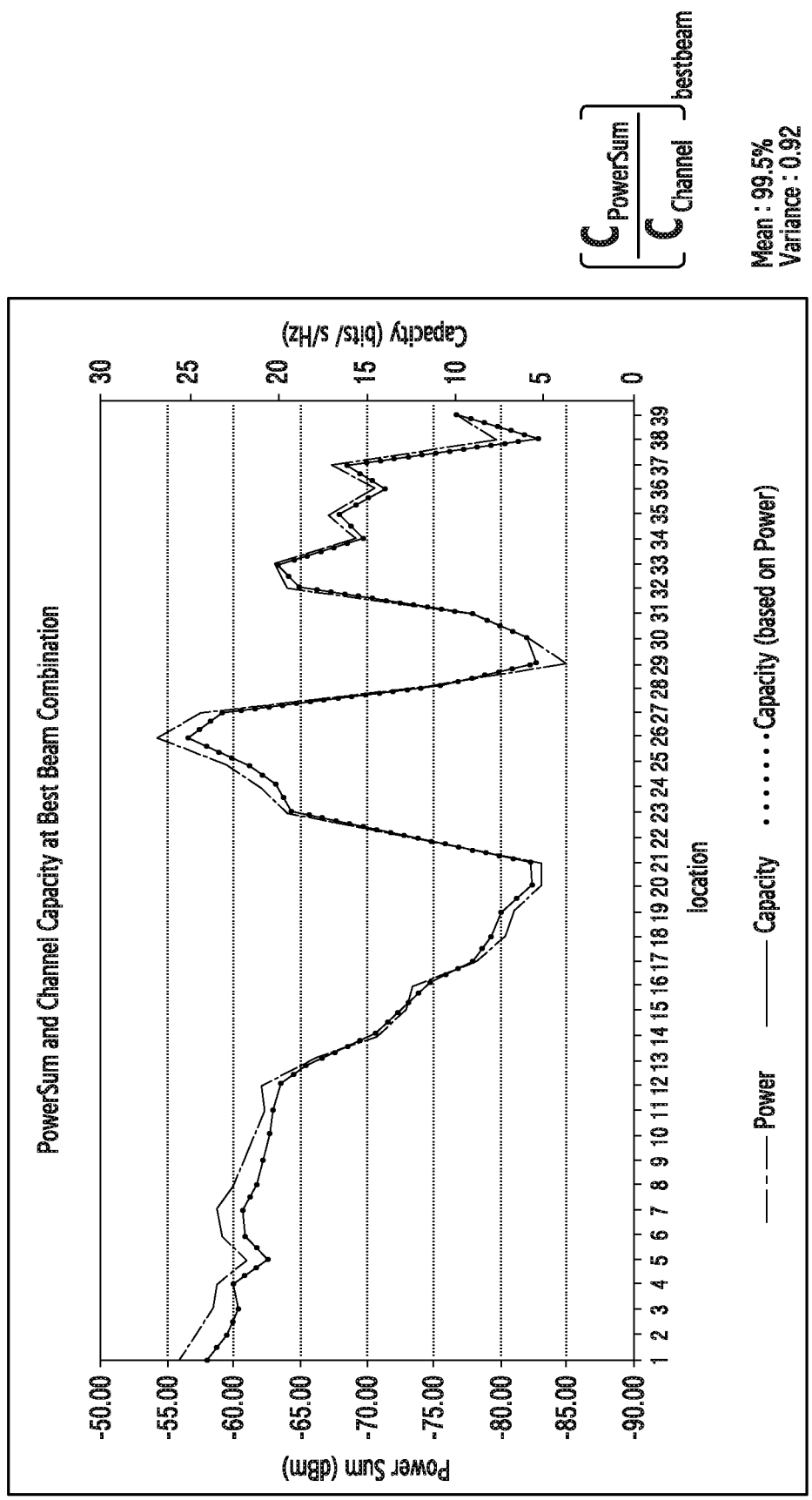
FIGS. 10A to 10D are diagrams illustrating the results of analyzing and comparing power and channel capacity associated with a best beam combination in a beamforming MIMO system according to embodiments of the present disclosure.

Referring to FIG. 10A, there is an approximately 66.6% probability that a best beam combination selection result obtained based on power and a best beam combination selection result obtained based on a channel capacity will be identical to each other. There is a 92.3% probability that the best beam combination obtained based on power will exist within 2% on the basis of the best beam combination obtained based on the channel capacity. The average and the variance of the ratio of the channel capacity value of the best beam combination obtained based on power to the channel capacity value of the best beam combination obtained based on the channel capacity are 99.5% and 0.92, respectively. This indicates that the power-based best beam selection and the channel capacity-based best beam selection are similar to each other as illustrated.

Figure 10B:
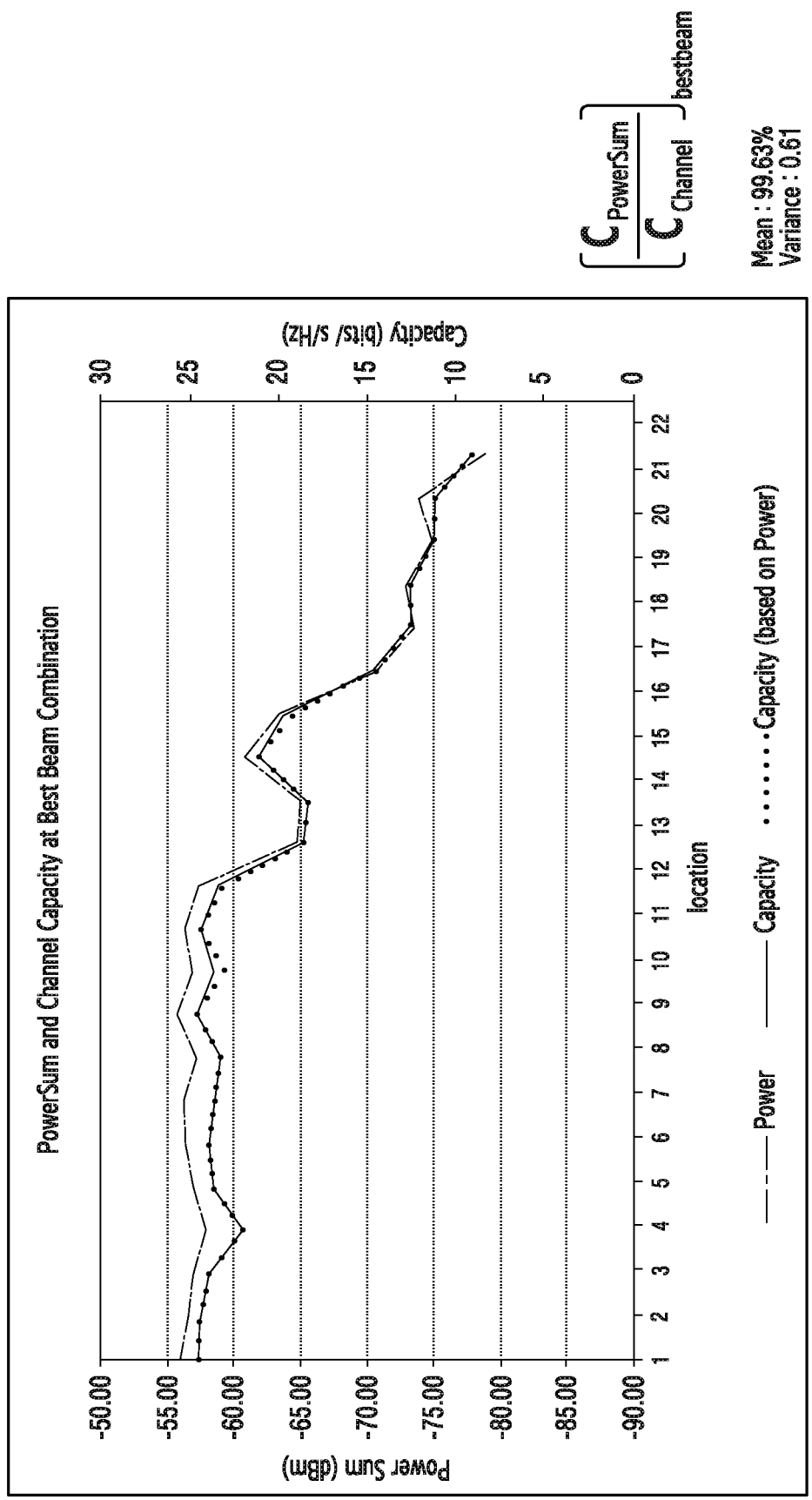

Referring to FIG. 10B, there is an approximately 72.7% probability that a best beam combination selection result obtained based power and a best beam combination selection result obtained based on a channel capacity will be identical to each other. There is a 100% probability that the best beam combination obtained based on power will exist within 2% on the basis of the best beam combination obtained based on the channel capacity. The average and the variance of the ratio of the channel capacity value of the best beam combination obtained based on power to the channel capacity value of the best beam combination obtained based on the channel capacity are 99.63% and 0.61, respectively. This indicates that the power-based best beam selection and the channel capacity-based best beam selection are similar to each other as illustrated above.

Figure 10C:
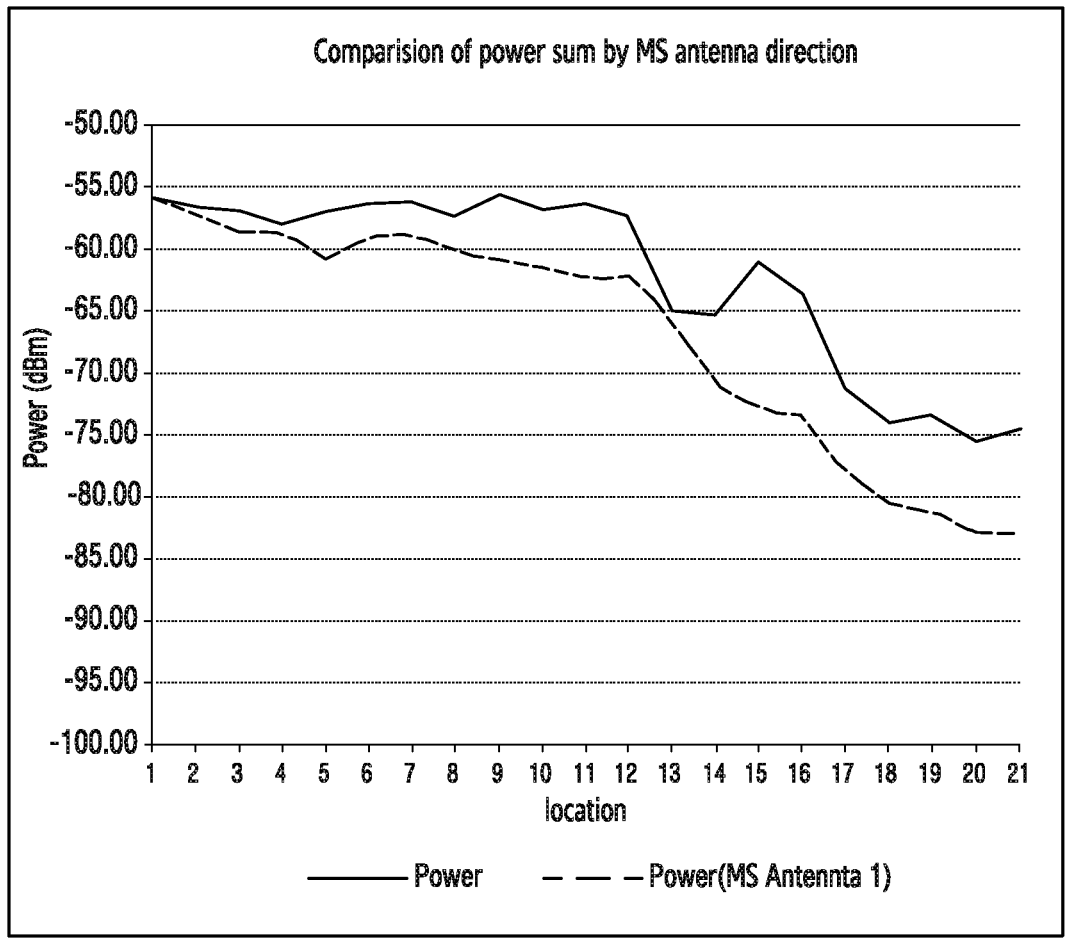
Figure 10D:
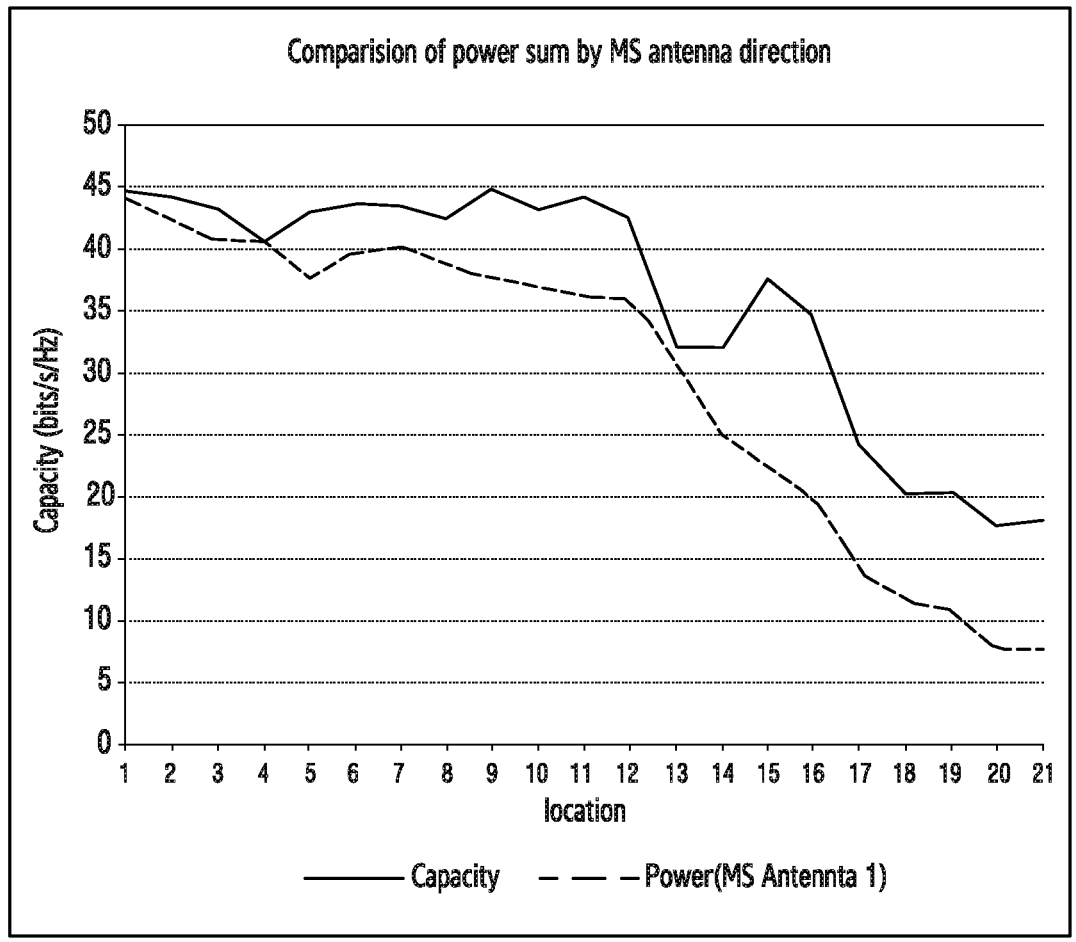

Referring to FIGS. 10C and 10D, the tendencies of the power sum and channel capacity are similar, irrespective of an antenna direction of a terminal.

FIG. 3 is a diagram illustrating the basic structure of a beamforming MIMO system to which embodiments of the present disclosure are applied.

Referring to FIG. 3, a beamforming MIMO system includes a transmitting device 5. A MIMO transmission route 10 of the transmitting device 5 outputs information stream #0 and information stream #1. The information stream #0 may undergo transmission processing via a mixer 21, a phase shifter 31, and a power amplifier 41. The transmission-processed information stream #0 may be output to a MIMO channel through uniform liner transmission array antenna #0. The information stream #1 may undergo transmission processing via a mixer 22, a phase shifter 32, and a power amplifier 42. The transmission-processed information stream #1 may be output to the MIMO channel through transmission array antenna #1.

The beamforming MIMO system includes a receiving device 50. The receiving device 50 performs reception processing of information streams output to the MIMO channel. The information stream #0 output to the MIMO channel may be received through reception array antenna #0, and undergoes reception processing via a low-noise amplifier 61, a phase shifter 71, and a mixer 81. The reception-processed information stream #0 may be input into a MIMO reception route 90.

FIG. 4 is a diagram illustrating the configuration of a receiving device of a beamforming MIMO system to which embodiments of the present disclosure are applied. For example, a receiving device of a MIMO system may be the terminal 200 of FIG. 1.

Referring to FIG. 4, the receiving device includes an antenna unit 210, a transceiver 220, a controller 230, and a storage unit 240.

The antenna unit 210 transmits a signal transmission-processed by the transceiver 220 through a radio channel, and receives a signal on the radio channel. The antenna unit 210 may include a plurality of antennas, array antennas, or antenna elements for supporting beamforming.

The transceiver 220 performs transmission-processing of a signal to be transmitted, and performs reception processing of a received signal. For example, the transceiver 220 performs a function of conversion between a baseband signal and a bit stream according to a physical layer standard of the system. When data is transmitted, the transceiver 220 encodes and modulates a transmission bit stream, so as to generate complex symbols. When data is received, the transceiver 220 restores a reception bit stream by demodulating and decoding a baseband signal. In this instance, the transceiver 220 divides a received signal into in units of OFDM symbols, and performs a fast Fourier transform (FFT) operation for the OFDM symbols, thereby restoring complex symbols for each subcarrier. Also, the transceiver 220 up-converts a baseband signal into a radio frequency (RF) band signal and transmits the same through the antenna unit 210, and down-converts an RF band signal received through the antenna unit 210 into a baseband signal. For example, the transceiver 220 may include a transmission filter, a reception filter, an amplifier, a mixer, an oscillator, a Digital-to-Analog Converter (DAC), an Analog-to-Digital Converter (ADC), and the like.

Also, the transceiver 220 may include a plurality of RF chains. In addition, the transceiver 220 may perform beamforming. To perform beamforming, the transceiver 220 may control the phase and the size of each signal that is transmitted or received through a plurality of antennas or antenna elements. The transceiver 220 may transmit and receive a signal as described above. The transceiver 220 may be referred to as a communication unit or a transceiving unit. Depending on cases, the transceiver 220 may be separately illustrated as a transmitter and a receiver or a transmitting unit and a receiving unit.

The storage unit 240 may store data, such as a basic program, an application program, configuration information, and the like for operating the receiving device. In addition, the storage unit 240 may provide data stored therein in response to a request from the controller 230.

The controller 230 may control operation of the terminal. For example, the controller 230 may transmit and receive signals through the transceiver 220. Further, the controller 230 records data in the storage unit 240 and reads the recorded data. To this end, the controller 230 may include at least one processor. For example, the controller 230 may include a communication processor (CP) that performs control for communication, and an application processor (AP) that controls a higher layer such as an application program.

For the beam selection and feedback operations according to embodiments of the present disclosure, the controller 230 includes a beam measuring module 232, a beam selecting module 234, and feedback information generating module 236. The beam measuring module 232 measures a plurality of reception beams. The beam selecting module 234 selects a best beam combination from among a plurality of transmission/reception beam combinations based on the beam measurement result obtained by the beam measuring module 232. The feedback information generating module 236 generates information on the best beam combination selected by the beam selecting module 234.

According to an embodiment of the present disclosure, a receiving device (or a terminal device) includes: a controller 230 for selecting at least one beam combination from among a plurality of transmission/reception beam combinations; and a transmitting unit 220 for transmitting feedback information including indication information indicating whether the at least one beam combination is identical to a previous best beam combination.

According to an embodiment, when the previous best beam combination is identical to the at least one beam combination, the transmitting unit 220 transmits the feedback information including the indication information indicating that the beams are not changed.

According to another embodiment, when the previous best beam combination is different from the at least one beam combination, the transmitting unit 220 transmits feedback information including indication information indicating that the beams are changed and information on the at least one beam combination.

According to an embodiment, the controller 230 selects, as at least one beam combination, a predetermined number of beam combinations from the plurality of transmission/reception beam combinations. For example, the number of beam combinations may be fixedly determined. As another example, the number of beam combinations may be variably determined by a base station. The base station may determine the number of beam combinations based on power or based on the amount of interference and quality of channel.

According to an embodiment, the controller 230 determines, as beam candidates, a predetermined number of beam combinations from the plurality of transmission/reception beam combinations. When the previous best beam combination is included in the beam candidates, the controller 230 may determine may determine a difference in channel capacity values between a beam combination having the maximum power value from among the beam candidates and the previous best beam combination. The controller 230 may select at least one beam combination based on the result of comparing the different and a predetermined threshold value.

According to an embodiment, when the difference is less than the threshold value, the controller 230 may select the previous best beam combination as the at least one beam combination.

According to another embodiment, when the difference is greater than or equal to the threshold value, the controller 230 may select a beam combination having the maximum channel capacity value from among beam combinations included in the beam candidates, as the at least one beam combination.

According to another embodiment, when the difference is greater than or equal to the threshold value, the controller 230 may select a beam combination having the maximum power value from among beam combinations included in the beam candidates, as the at least one beam combination.

According to an embodiment, the threshold value may be fixedly determined for a terminal. As another example, the threshold value may be variably determined by a base station. The threshold value may be determined based on power, or based on the amount of interference and quality of channel.

FIG. 5 is a diagram illustrating the configuration of a transmitting device of a beamforming MIMO system to which embodiments of the present disclosure are applied. For example, a transmitting device of a MIMO system may be the base station 100 of FIG. 1.

Referring to FIG. 5, the transmitting device includes an antenna unit 110, a transceiver 120, a controller 130, and a storage unit 140.

The antenna unit 110 transmits, through a radio channel, a signal transmission-processed by the transceiver 120, and receives a signal on the radio channel. The antenna unit 110 may include a plurality of antennas, array antennas, or antenna elements for supporting beamforming.

The transceiver 120 performs transmission-processing of a signal to be transmitted, and performs reception processing of a received signal. For example, the transceiver 120 performs a function of conversion between a baseband signal and a bit stream according to a physical layer standard of the system. When data is transmitted, the transceiver 120 encodes and modulates a transmission bit stream, so as to generate complex symbols. In this instance, the transceiver 120 may map the complex symbols to subcarriers and generate OFDM symbols through an inverse fast Fourier transform (IFFT) operation. When data is received, the transceiver 120 reconstructs a reception bit stream by demodulating and decoding a baseband signal. Also, the transceiver 120 up-converts a baseband signal into a radio frequency (RF) band signal and transmits the same through the antenna unit 110, and down-converts an RF band signal received through the antenna unit 110 into a baseband signal. For example, the transceiver 120 may include a transmission filter, a reception filter, an amplifier, a mixer, an oscillator, a digital-to-analog converter (DAC), an analog-to-digital converter (ADC), and the like.

Also, the transceiver 120 may include a plurality of RF chains. In addition, the transceiver 120 may support beamforming. To perform beamforming, the transceiver 120 may control the phase and the size of each signal that is transmitted or received through a plurality of antennas or antenna elements included in the antenna unit 110. Also, the transceiver 120 may perform precoding for a plurality of transmitted data streams. Accordingly, the transmitting device may perform MU-MIMO communication. The transceiver 120 may transmit and receive a signal as described above. The transceiver 120 may be referred to as a communication unit or a transceiving unit. Depending on cases, the transceiver 120 may be separately illustrated as a transmitter and a receiver or a transmitting unit and a receiving unit.

The storage unit 140 may store data, such as a basic program, an application program, configuration information, and the like for operating the transmitting device. In addition, the storage unit 140 may provide data stored therein in response to a request from the controller 130.

The controller 130 may control operation of the transmitting device. For example, the controller 130 may transmit and receive signals through the transceiver 120. Also, the controller 130 may record data in the storage unit 140, and may read data recorded therein. To this end, the controller 130 may include at least one processor.

For the beam selection and feedback operations according to embodiments of the present disclosure, the controller 130 may include a feedback information receiving module 132, a beam candidate number and ratio determining module 134, and a threshold value determining module 136. The feedback information receiving module 132 receives feedback information received from a receiving device. The beam candidate number or radio determining module 134 may determine the number of beam candidates or the ratio of beam candidates to be used when the receiving device performs a best beam selection operation. The threshold value determining module 136 determines a threshold value to be used when the receiving device performs a best beam selection operation.

According to embodiments of the present disclosure, the transmitting device (or a base station device) of a wireless communication system includes the transceiver 120 that receives feedback information including indication information indicating whether at least one beam combination selected from among a plurality of transmission/reception beam combinations is identical to a previous best beam combination.

According to an embodiment, when the previous best beam combination is identical to the at least one beam combination, the transceiver 120 receives the feedback information including indication information indicating that the beams are not changed.

According to another embodiment, when the previous best beam combination is different from the at least one beam combination, the transceiver 120 receives the feedback information including indication information indicating that the beams are changed and information on the at least one beam combination.

According to an embodiment, the at least one beam combination includes a predetermined number of beam combinations from the plurality of transmission/reception beam combinations.

According to an embodiment, the number of beam combinations may be fixedly determined for the terminal. According to another embodiment, the number of beam combinations may be variably determined by a base station. The number of beam combinations may be determined based on power or based on the amount of interference and a channel quality.

According to an embodiment, when the previous best beam combination is included in beam candidates including a predetermined number of beam combinations from among the plurality of transmission/reception beam combinations, the at least one beam combination may be selected by comparing a predetermined threshold value and a difference between a channel capacity value of a beam combination having the maximum power value from among the beam candidates and a channel capacity value of the previous best beam combination.

According to an embodiment, when the difference is less than the threshold value, the previous best beam combination is selected as the at least one beam combination. According to another embodiment, when the difference is greater than or equal to the threshold value, a beam combination having the maximum channel capacity from among beam combinations included in the beam candidates is selected as the at least one beam combination. According to another embodiment, when the difference is greater than or equal to the threshold value, a beam combination having the maximum power value from among beam combinations included in the beam candidates is selected as the at least one beam combination.

According to an embodiment, the threshold value may be fixedly determined for the terminal. As another example, the threshold value may be variably determined by a base station. The threshold value may be determined based on power, or based on the amount of interference and a channel quality.

Figure 6A:
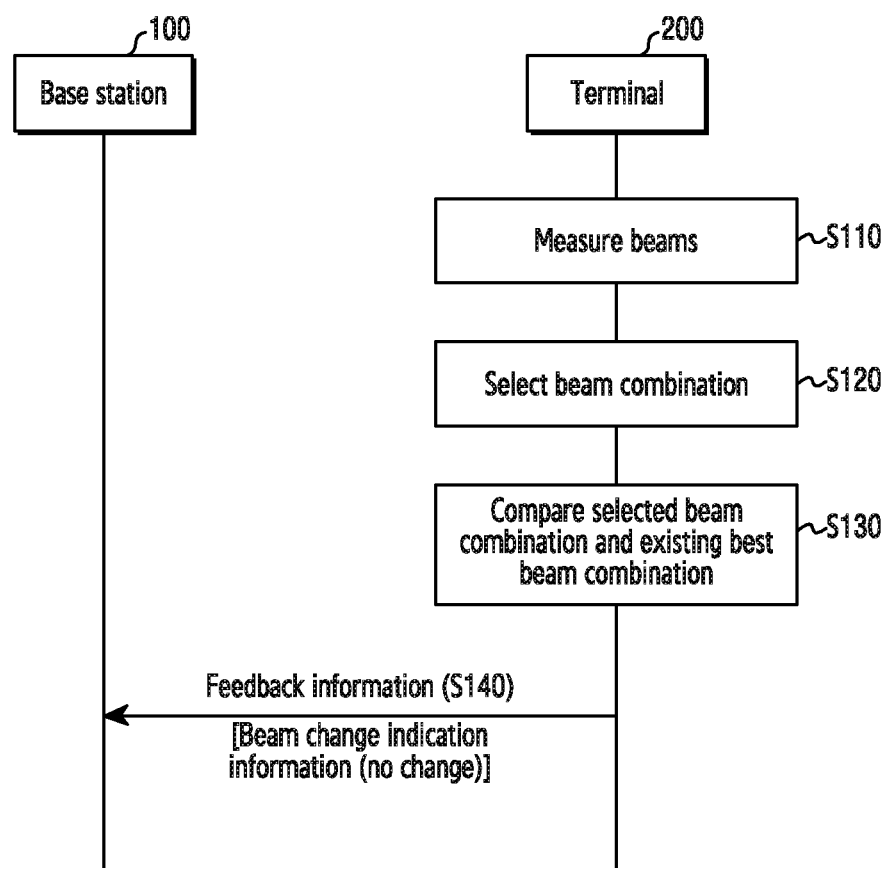
FIG. 6A is a diagram illustrating an example of a procedure of processing a beam selection operation and a feedback operation in a beamforming MIMO system according to embodiments of the present disclosure.

FIG. 6A is a diagram illustrating an example of a procedure of processing a beam selection operation and a feedback operation in a beamforming MIMO system according to embodiments of the present disclosure. For example, the procedure of processing beam selection and feedback operations may be performed between the base station 100 and the terminal 200 of FIG. 1.

Referring to FIG. 6A, the terminal 200 measures a plurality of reception beams in operation S110. In operation S120, the terminal 200 selects at least one beam combination from among a plurality of transmission/reception beam combinations based on the beam measurement result. In operation S130, the terminal 200 compares the at least one selected beam combination and an existing (or previous) best beam combination.

In operation S140, the terminal 200 generates feedback information based on the result of comparing the at least one selected beam combination and the previous best beam combination, and transmits the same to the base station 100. For example, when the previous best beam combination is identical to the at least one selected beam combination, the terminal 200 generates feedback information including indication information indicating that beams are not changed, and transmits the generated feedback information to the base station 100.

Figure 6B:
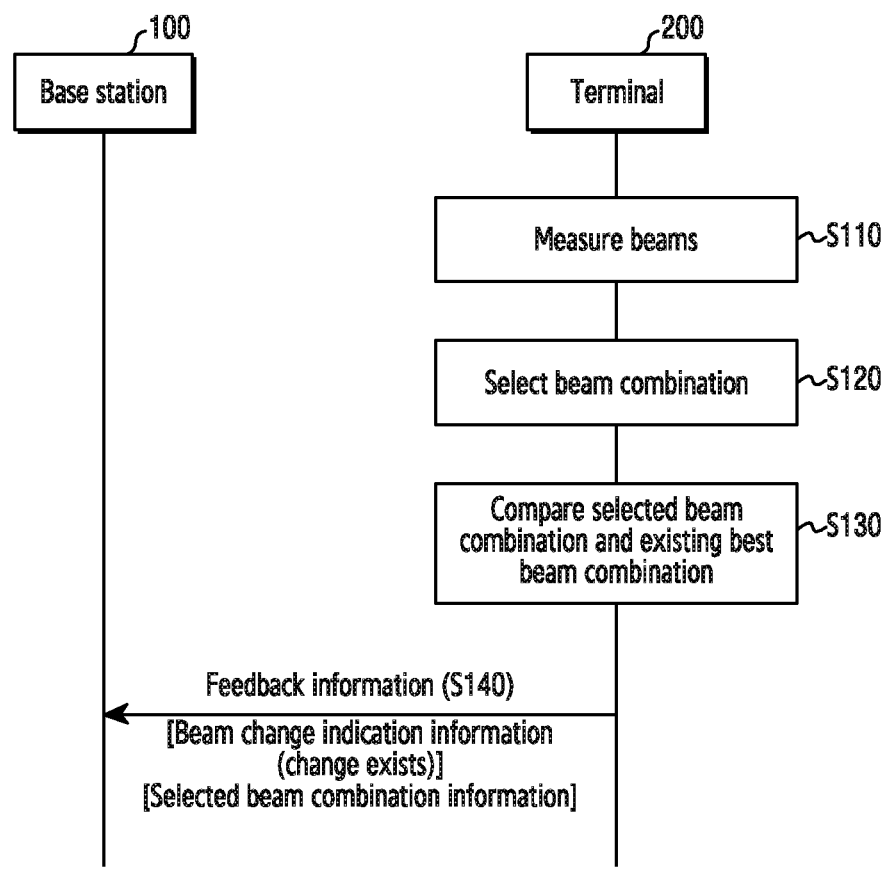
FIG. 6B is a diagram illustrating another example of a procedure of processing a beam selection operation and a feedback operation in a beamforming MIMO system according to embodiments of the present disclosure.

FIG. 6B is a diagram illustrating another example of a procedure of processing a beam selection operation and a feedback operation in a beamforming MIMO system according to embodiments of the present disclosure. For example, the procedure of processing beam selection and feedback operations may be performed between the base station 100 and the terminal 200 of FIG. 1.

Referring to FIG. 6B, the terminal 200 measures a plurality of reception beams in operation S110. In operation S120, the terminal 200 selects at least one beam combination from among a plurality of transmission/reception beam combinations based on the beam measurement result. In operation S130, the terminal 200 compares the at least one selected beam combination and an existing (or previous) best beam combination.

In operation S140, the terminal 200 generates feedback information based on the result of comparing the at least one selected beam combination and the previous best beam combination, and transmits the same to the base station 100. For example, when the previous best beam combination is different from the at least one selected beam combination, the terminal 200 generates feedback information including indication information indicating that beams are changed and information on the at least one beam combination, and transmits the generated feedback information to the base station 100.

Figure 7:
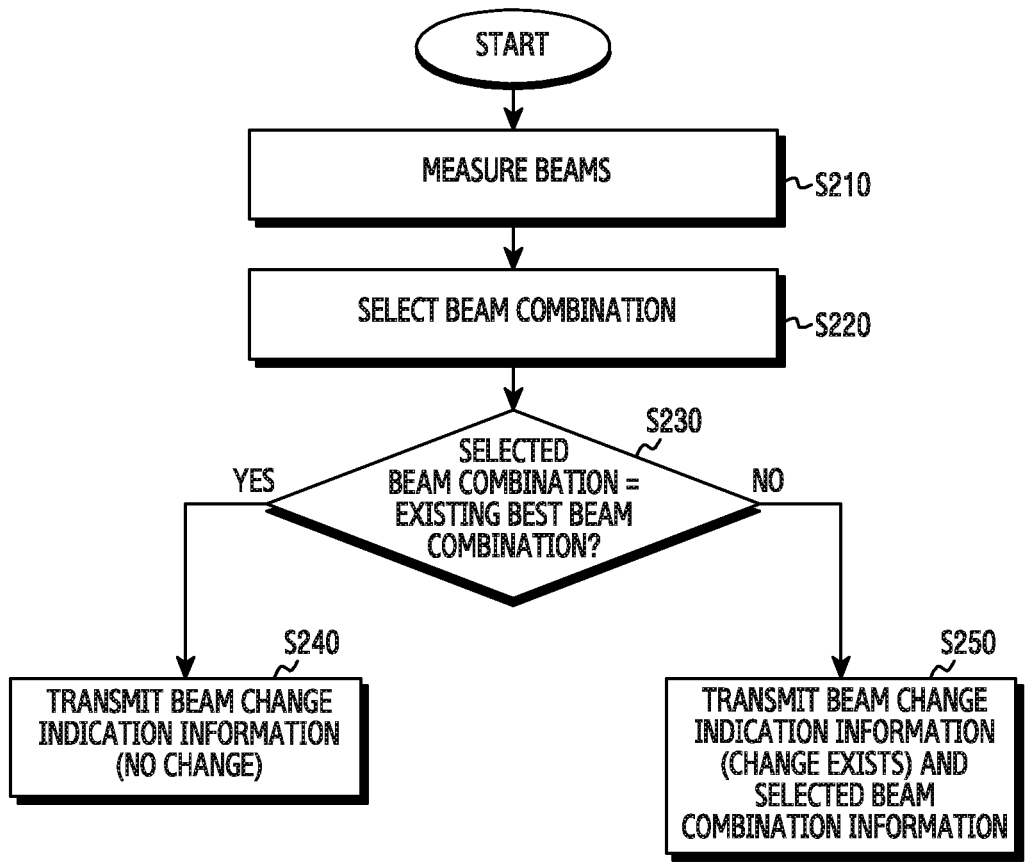
FIG. 7 is a diagram illustrating a processing flow of a beam selection operation and a feedback operation executed by a receiving device according to an embodiment of the present disclosure.

FIG. 7 is a diagram illustrating a processing flow of a beam selection operation and feedback operation executed by a receiving device according to an embodiment of the present disclosure. For example, the processing flow may be performed by the terminal 200 of FIG. 1. The processing flow corresponds to an example in which the number of at least one beam combination selected by the terminal 200 is 1. Here, it is assumed that the terminal 200 knows of information on a best transmission beam for each antenna of the base station 100.

Referring to FIG. 7, the terminal 200 measures a plurality of reception beams in operation S210. In operation S220, the terminal 200 selects at least one beam combination from among a plurality of transmission/reception beam combinations based on the beam measurement result. In operation S230, the terminal 200 compares the at least one selected beam combination and an existing (or previous) best beam combination.

When the previous best beam combination is identical to the at least one selected beam combination, the terminal 200 generates feedback information including indication information indicating that beams are not changed, and transmits the generated feedback information to the base station 100 in operation S240.

When the previous best beam combination is different from the at least one selected beam combination, the terminal 200 generates feedback information including indication information indicating that beams are changed and information on the at least one beam combination, and transmits the generated feedback information to the base station 100 in operation S250.

Figure 8:
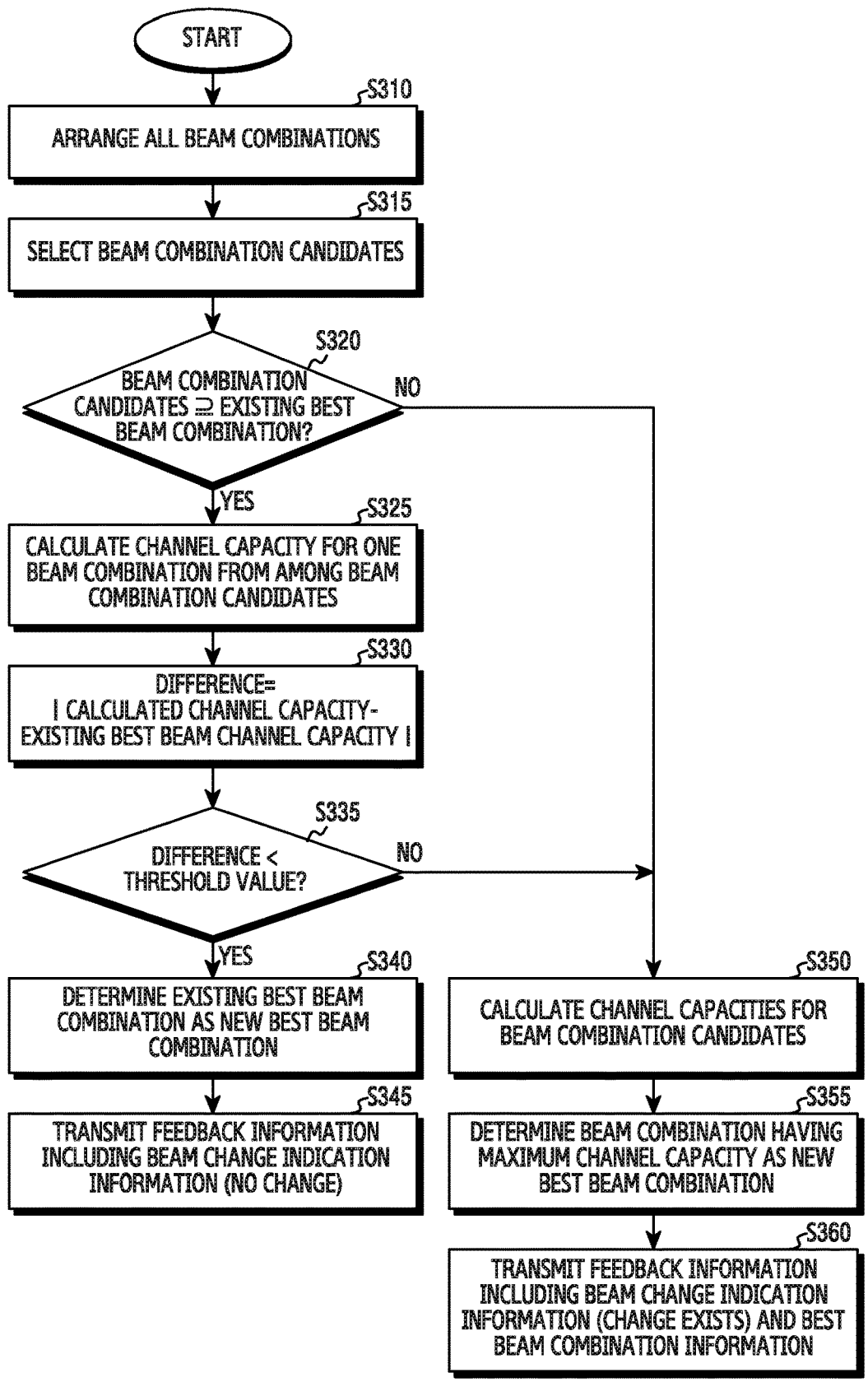
FIG. 8 is a diagram illustrating a processing flow of a beam selection operation and a feedback operation executed by a receiving device according to another embodiment of the present disclosure.

FIG. 8 is a diagram illustrating a processing flow of a beam selection operation and a feedback operation executed by a receiving device according to another embodiment of the present disclosure. For example, the processing flow may be performed by the terminal 200 of FIG. 1. Here, it is assumed that the terminal 200 knows of information on a best transmission beam for each antenna of the base station 100.

Referring to FIG. 8, the terminal 200 arranges all beam combinations in operation S310. In this instance, the terminal 200 arranges the all beam combinations based on power according to a reception beam measurement result.

In operation S315, the terminal 200 selects as many beam combination candidates as a predetermined number of beam combinations or a predetermined ratio of beam combinations from among a plurality of transmission/reception beam combinations. For example, k beam combinations from among the plurality of transmission/reception beam combinations may be selected as the beam combination candidates based on the maximum power value. As another example, beam combinations within L % from among the plurality of transmission/reception beam combinations may be selected as the beam combination candidates based on the maximum power value.

In operation S320, the terminal 200 determines whether an existing best beam combination is included in the selected beam combination candidates. When it is determined that the existing best beam combination is included in the selected beam combination candidates, the terminal 200 proceeds with operation S325. When it is determined that the existing best beam combination is not included in the selected beam combination candidates, the terminal 200 proceeds with operation S350.

In operation S325, the terminal 200 calculates a channel capacity of one beam combination having the maximum power value from among the beam combination candidates. In operation S330, the terminal 200 calculates a difference between the calculated channel capacity value and the channel capacity value of the existing best beam.

In operation S335, the terminal 200 determines whether the calculated difference is less than a threshold value. When it is determined that the difference is less than the threshold value, the terminal 200 proceeds with operation S340. When it is determined that the difference is greater than or equal to the threshold value, the terminal 200 proceeds with operation S350.

In operation S340, the terminal 200 determines the existing best beam combination as a new best beam combination. In operation S345, the terminal 200 generates feedback information including beam change indication information (no change), and transmits the generated feedback information to the base station 100.

In operation S350, the terminal 200 calculates channel capacities of beam combination candidates. In operation S355, the terminal 200 determines a beam combination having the maximum channel capacity value as a new best beam combination. In operation S360, the terminal 200 generates feedback information including beam change indication information (change exists) and information on the best beam combination, and transmits the generated feedback information to the base station 100.

Figure 9:
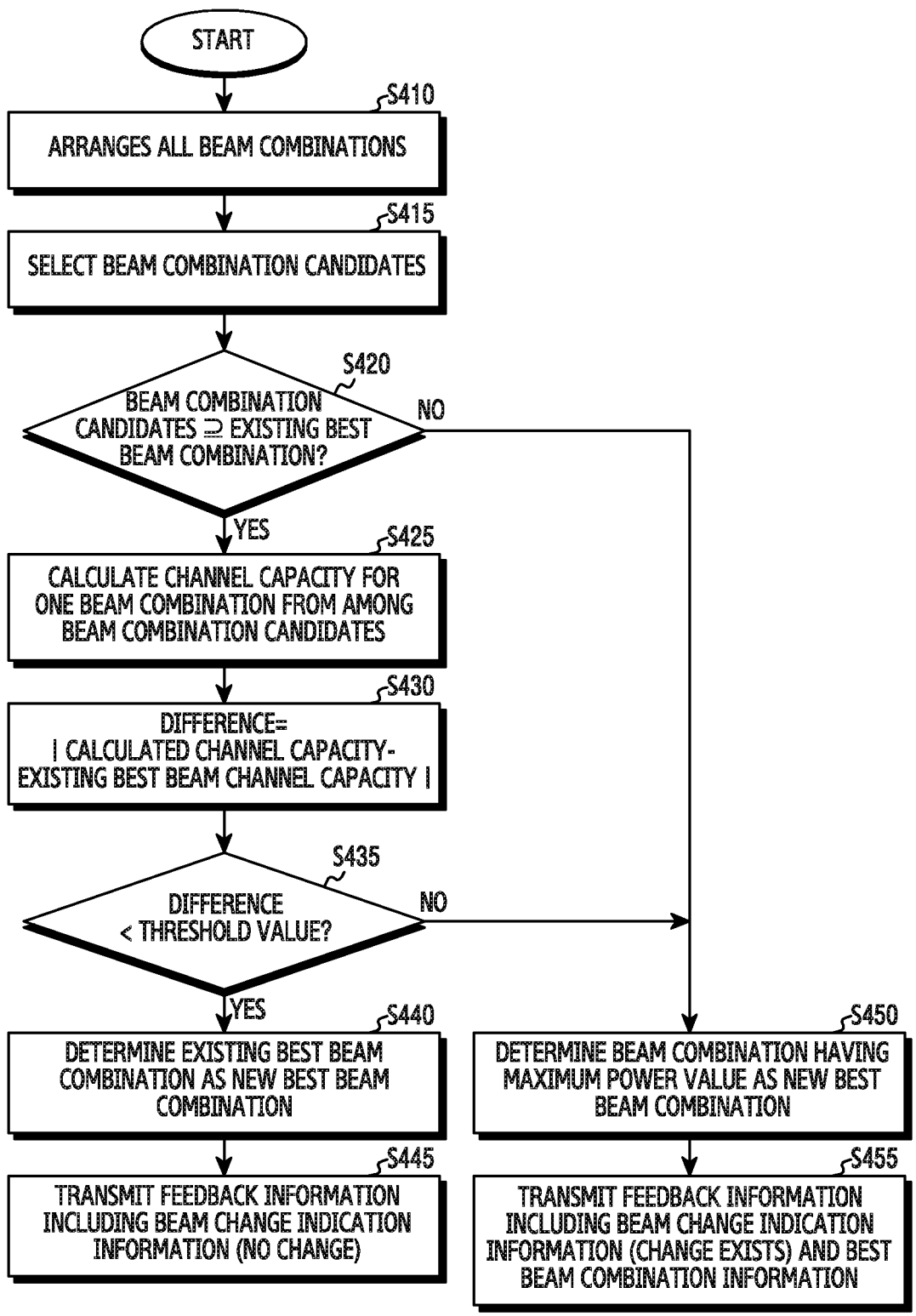
FIG. 9 is a diagram illustrating a processing flow of a beam selection operation and a feedback operation executed by a receiving device according to another embodiment of the present disclosure.

FIG. 9 is a diagram illustrating a processing flow of a beam selection operation and a feedback operation executed by a receiving device according to another embodiment of the present disclosure. For example, the processing flow may be performed by the terminal 200 of FIG. 1.

Referring to FIG. 9, the terminal 200 arranges all beam combinations in operation S410. In this instance, the terminal 200 arranges the all beam combinations based on power according to a reception beam measurement result.

In operation S415, the terminal 200 selects as many beam combination candidates as a predetermined number of beam combinations or a predetermined ratio of beam combinations from among a plurality of transmission/reception beam combinations. For example, k beam combinations from among the plurality of transmission/reception beam combinations may be selected as the beam combination candidates based on the maximum power value. As another example, beam combinations within L % from among the plurality of transmission/reception beam combinations may be selected as the beam combination candidates based on the maximum power value.

In operation S420, the terminal 200 determines whether an existing best beam combination is included in the selected beam combination candidates. When it is determined that the existing best beam combination is included in the selected beam combination candidates, the terminal 200 proceeds with operation S425. When it is determined that the existing best beam combination is not included in the selected beam combination candidates, the terminal 200 proceeds with operation S450.

In operation S425, the terminal 200 calculates a channel capacity of one beam combination having the maximum power value from among the beam combination candidates. In operation S430, the terminal 200 calculates a difference between the calculated channel capacity value and the channel capacity value of the existing best beam.

In operation S435, the terminal 200 determines whether the calculated difference is less than a threshold value. When it is determined that the difference is less than the threshold value, the terminal 200 proceeds with operation S440. When it is determined that the difference is greater than or equal to the threshold value, the terminal 200 proceeds with operation S450.

In operation S440, the terminal 200 determines the existing best beam combination as a new best beam combination. In operation S445, the terminal 200 generates feedback information including beam change indication information (no change), and transmits the generated feedback information to the base station 100.

In operation S450, the terminal 200 determines the beam combination having the maximum power value from among the beam combination candidates as a new best beam combination. In operation S455, the terminal 200 generates feedback information including beam change indication information (change exists) and best beam combination information, and transmits the generated feedback information to the base station 100.

Figure 11:
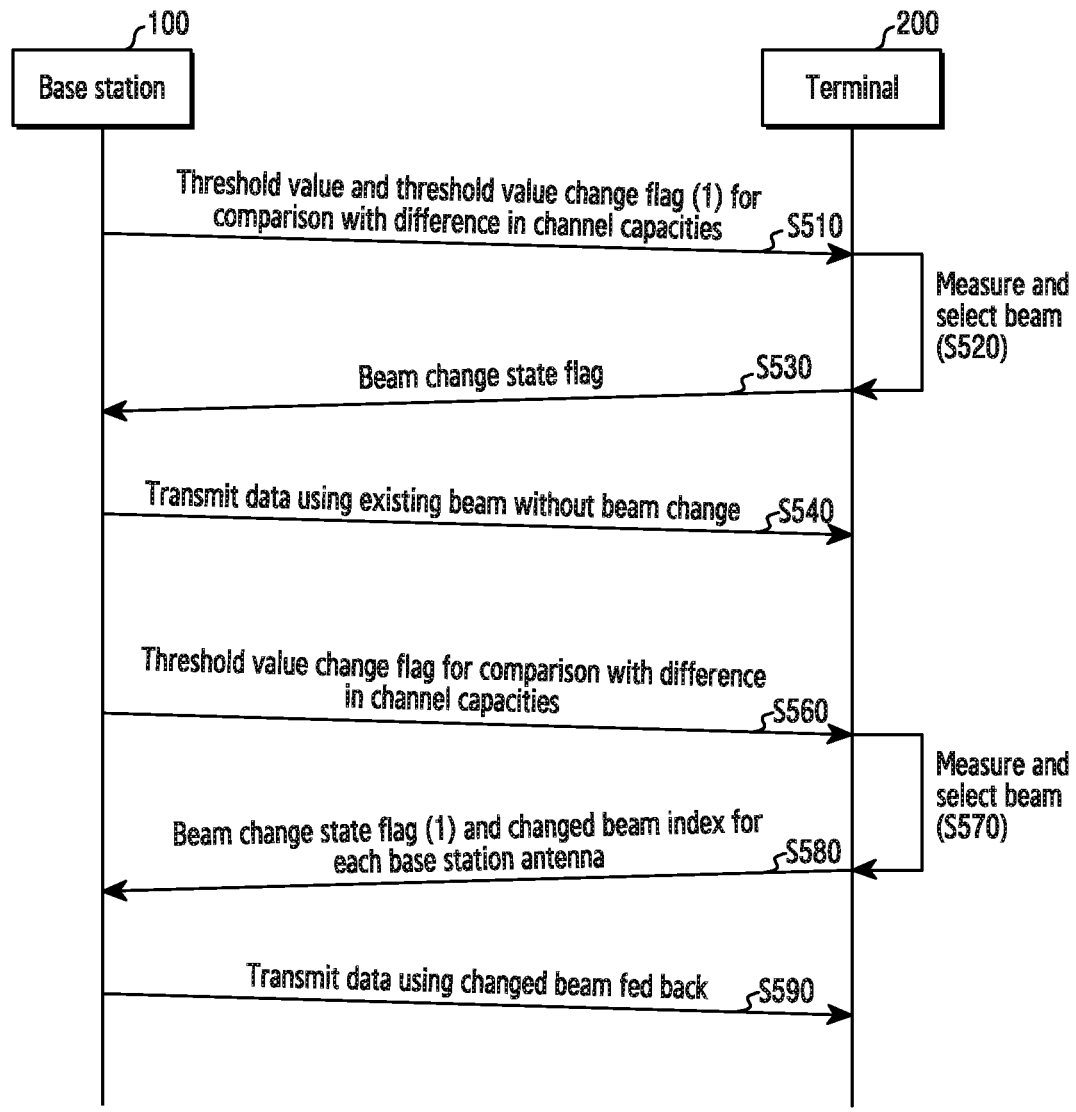
FIG. 11 is a diagram illustrating an example of a procedure of processing a threshold value transmission, a beam selection operation, and a feedback operation in a beamforming MIMO system according to embodiments of the present disclosure.

FIG. 11 is a diagram illustrating an example of a procedure of processing a threshold value transmission, a beam selection operation, and a feedback operation in a beamforming MIMO system according to embodiments of the present disclosure. For example, the processing flow may be performed by the base station 100 and the terminal 200 of FIG. 1.

Referring to FIG. 11, the base station 100 transmits, to the terminal 200, a threshold value and a threshold value change flag (1) for comparison with a difference in channel capacities in operation S510. The threshold value change flag (1) includes information indicating that the threshold value is changed.

The terminal 200 performs a beam measurement and selection operation based on the threshold value and the threshold value change flag (1) received from the base station 100 in operation S520. When the selected beam combination is identical to an existing best beam combination, the terminal 200 transmits a beam change state flag (0) to the base station 100. The beam change state flag (0) includes information indicating that the existing best beam combination is not changed.

When the beam change state flag (0) is received, the base station 100 transmits data using the existing best transmission beam without beam change.

The base station 100 transmits, to the terminal 200, a threshold value change flag (0) for comparison with a difference in channel capacities in operation S560. The threshold value change flag 0 includes information indicating that the threshold value is not changed.

The terminal 200 performs a beam measurement and selection operation based on the existing threshold value based on the threshold value change flag (0) received from the base station 100 in operation S570. When the selected beam combination is different from the existing best beam combination, the terminal 200 transmits, to the base station 100, the beam change state flag (1) and information on a best beam combination including changed beams, that is, a best beam index for each base station antenna, to the base station 100. The beam change state flag (1) includes information indicating that the existing best beam combination is changed.

In operation S590, when the beam change state flag (1) is received, the base station 100 transmits data using a changed beam which is fed back.

A periodic beam selection and feedback operation according to the processing flow as illustrated in FIGS. 6A to 9 and FIG. 11 is to select a best beam for inter-beam handover, and includes setting beam candidates, selecting a beam based on a threshold value from the beam candidates, minimizing calculation (processing time) of a large number of beam combinations, and simplifying the amount of feedback information. The beam selection and feedback operation according to embodiments of the present disclosure will be described in detail.

(Operation 1) the terminal 200 determines feedback beam candidates (operations S210 and S220 of FIG. 7, operations S310 and S315 of FIG. 8, and operations S410 and S415 of FIG. 9) For example, the terminal 200 may determine the feedback beam candidates through various power-based methods. The terminal 200 always measures reception power and may set beam candidates using the same. The following methods may be used to set the beam candidates.

(Example, 1-A) a terminal selects beam combinations within L % or k beam combinations based on the maximum value based on the total sum of power values measured for each reception antenna of the terminal. For example, the total sum of power values measured for each reception antenna of the terminal may be obtained by Equation 3 provided below.

$$\text{Power} = \sum_{r=0}^{M-1} \sum_{t=0}^{N-1} |Y_{t,r}|^2 \qquad \text{Equation 3}$$

Here, r denotes a terminal antenna number. M denotes the number of antennas of a terminal. t denotes a base station antenna number. N denotes the number of antennas of a base station. It should be construed that a beam index for each base station antenna and each terminal antenna is implicit and this may not be separately indicated.

(Example, 1-B) a terminal compares and arranges the sum of power values measured for each reception antenna of the terminal when a terminal antenna index and a base station antenna index are the same, and the sum of power values measured for each reception antenna of the terminal when the terminal antenna index and the base station antenna index are different from each other, and selects beam combinations within L % or k beam combinations based on the maximum value as beam candidates. Depending on the situations, beams that come through transpositions may have a high value. Equation 4 provided below denotes the sum in the case in which the base station antenna index and the terminal antenna index are the same. Equation 5 denotes the sum in the case in which the base station antenna index and the terminal antenna index are different from each other.

$$\text{Power} = \sum_{r=0}^{M-1} \sum_{t=0}^{N-1} |Y_{t=r}|^2 \qquad \text{Equation 4}$$

$$\text{Power} = \sum_{r=0}^{M-1} \sum_{t=0}^{N-1} |Y_{t \neq r}|^2 \qquad \text{Equation 5}$$

(Example 1-C) a terminal selects, as beam candidates, beam combinations within L % or k beam combinations based on the maximum value by calculating SINRs of all beam combinations for each antenna of a base station and the terminal.

(Example, 1-D) various methods may exist, other than the described methods.

According to embodiments of the present disclosure, a terminal sets beam candidates within L % or k beam combinations based on the maximum value obtained through calculation with respect to all beam combinations depending on situations.

According to an embodiment, the number of beam candidates or the ratio of beam candidates may be fixedly set for a terminal.

According to another embodiment, the number of beam candidates or the ratio of beam candidates may be set by a base station and may be provided to a terminal. The base station may periodically or arbitrarily transmit the values of L and K to the terminal based on terminal management, scheduling, and a channel condition, and may flexibly manage the same. The base station selects a beam from among beam candidates provided from the terminal due to interference with another terminal, for the purpose of managing inter-terminal interference or the like, and may perform transmission using the selected beam. The terminal may receive information on the value of L or K received from the base station, and may transmit k beam candidates through feedback.

L % or K which is the value used for setting beam candidates may be set as follows.

The base station may set the value of L % or K used for setting candidates, based on received signal power and a measurement value of interference such as a received signal strength indicator (RSSI), a received signal reference power (RSRP), a signal to noise ratio (SNR), signal to interference plus noise ratio (SINR), a channel quality indicator (CQI), or the like. For example, the measurement value may be measured by the base station through an uplink channel. As another example, the measurement value may be measured by the terminal, and may be fed back to the base station.

The base station may set the value of L % or K, which is used for setting candidates based on the measurement value, according to the following method.

According to a first method, the base station sets a value for setting candidates based on a power-based value, such as RSSI, RSRP, or the like. For example, when the measured power value is high, it is determined that a channel condition is good, whereby a candidate set value is set to be low (e.g., one). Unlike the above, when the measured power value is low, it is determined that a channel condition is poor, whereby a candidate set value is set to be high (e.g., two or more). The case in which the channel condition is poor may include the case in which the terminal is distant from the base station, or the case in which the terminal and the base station are in a non-line of signal (LOS) since they are being covered by a building or the like. In this instance, the base station may set the number of candidates to one or more, in order to reliably secure a link.

According to a second method, the base station sets a value for setting candidates based on the amount of interference and a channel quality. Interference come from the outside, such as a neighboring antenna or the like is included in a power value, and thus, the power value may be measured to be higher than an actual reception power. Therefore, when it is determined that the amount of interference is high and the quality of channel is poor based on a reception signal level including interference of an SINR and a CQI value obtained by measuring the quality of channel, the base station may set a candidate set value to be greater than or equal to 1 in order to secure a reliable link.

A power value, the amount of interference, and the quality of channel may be different based on an environment where the base station is installed. Accordingly, the base station needs to be installed in a place where the base station is to be actually used and an actual measurement value needs to be obtained through a test executed outside using the terminal. That is, a candidate set value needs to be appropriately set based on a field test.

Figure 13:
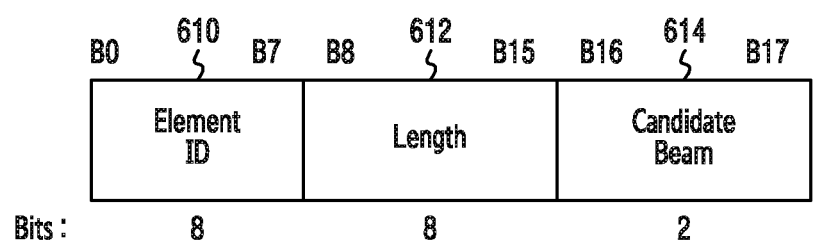
FIG. 13 is a diagram illustrating the configuration of beam candidates information according to an embodiment of the present disclosure.
Figure 14A:
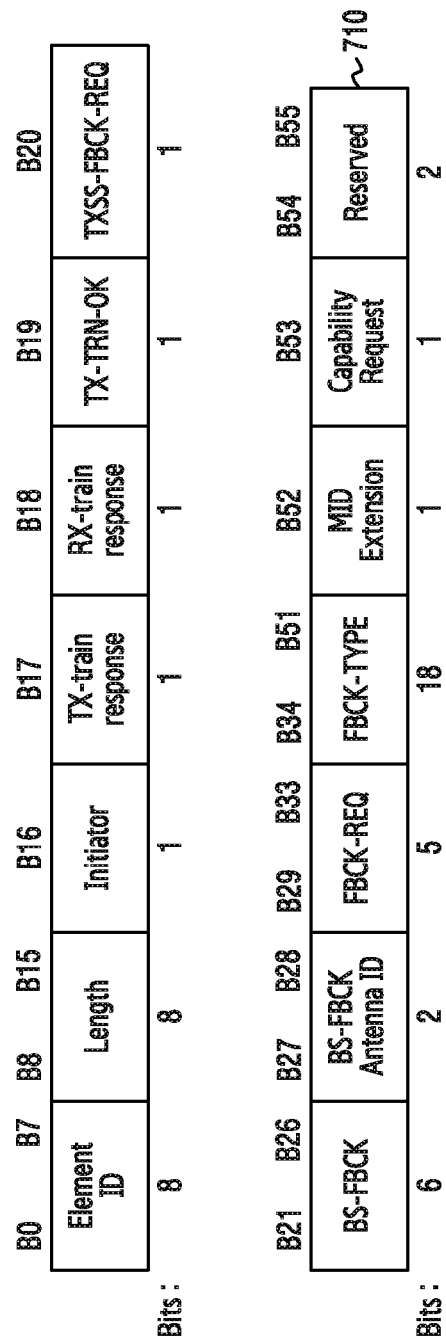
FIGS. 14A and 14B are diagrams illustrating the configuration of threshold value information according to an embodiment of the present disclosure.
Figure 14B:
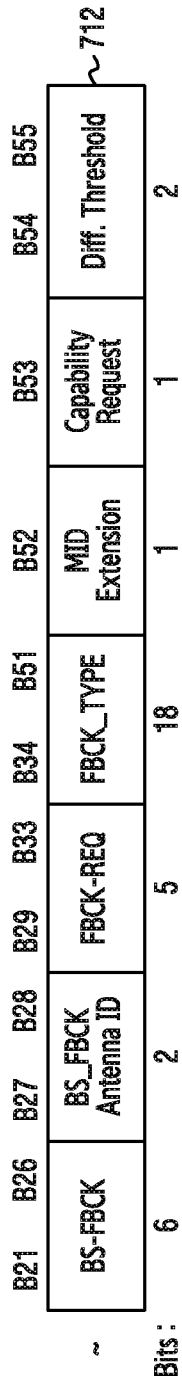

Information (or values) for setting beam combination candidates, which are determined by the base station, may have the structure of FIGS. 13 and 14*b*.

In the IEEE 802.11ad standard, which is called Wireless Gigabit (WiGig), a user-specific element may be defined and used. Therefore, the base station uses a candidate beam element format as illustrated in FIG. 13 in order to provide the value of L % or K for setting beam combination candidates. In FIG. 13, the candidate beam element format includes an element identity (ID) field 610, a length field 612, and a candidate beam field 614. The candidate beam field 614 includes the value of L % or K used for setting beam combination candidates. The element ID field 610 indicates that a corresponding element format is a candidate beam element format. For example, the element ID field 610 may be 8 bits, the length field 612 may be 8 bits, and the candidate beam field 614 may be 2 bits.

According to another embodiment, the base station may use a DMG beam refinement element format defined in the IEEE 802.11ad standard (WiGig) as illustrated in FIGS. 14A and 14B, in order to provide the value of L % or K used for setting beam combination candidates. A reserved region 710 of the format illustrated in FIG. 14A may be used as a region 712 (Diff. Threshold) for providing the value of L % or K used for setting beam combination candidates as illustrated in FIG. 14B.

The region 712 may also be used as a region for providing a threshold value used for a beam selection and feedback operation according to embodiments of the present disclosure.

(Operation 2) the terminal determines whether an existing best beam combination for each antenna is included in the selected k beam candidates (operation S230 of FIG. 7, operation S320 of FIG. 8, and operation S420 of FIG. 9). This operation corresponds to a primary filtering process under the assumption that channel capacity values of beams included in the beam candidates are similar. The case in which the beam combinations are similar may include the case in which the terminal is stationary, the case in which the terminal moves along the same beam direction, or the like.

(Operation 3) when the existing best beam combination is included in the K candidates, the terminal selects one beam combination having the maximum power value from the k beam candidates.

(Operation 4) the terminal calculates a channel capacity for the selected beam combination (operation S325 of FIG. 8 and operation S425 of FIG. 9). The terminal calculates a channel capacity for only the one selected candidate, as opposed to calculating channel capacities for all beam combinations for each antenna of the base station and the terminal. Therefore, processing time of calculation may be reduced to (1/the number of all beam combinations) compared to the case of calculating channel capacities for all beam combinations. Equation 6 provided below indicates an equation of calculating a channel capacity. Here, capacity denotes a channel capacity. I denotes an identity matrix. σ denotes a noise variance. H denotes a channel matrix formed between a terminal and a base station. H denotes a Hermit operator.

$$\text{Capacity} = \log_2\left(\det\left[I_{N_r} + \frac{1}{\sigma^2}HH^H\right]\right) \quad \text{Equation 6}$$

(Operation 5) the terminal calculates a difference between the calculated channel capacity of the new beam combination and the channel capacity of the currently used best beam combination, that is, the existing best beam combination (operation S330 of FIG. 8 and operation S430 of FIG. 9). This operation is one of the filtering process for selecting a beam based on a difference in channel capacities.

(Operation 6) the terminal compares a threshold value with the difference in the channel capacities between the new beam combination and the existing best beam combination (operation S335 of FIG. 8 and operation S435 of FIG. 9). This operation is a secondary filtering process that selects a beam. Here, the threshold value may be provided from the base station to the terminal by a predetermined period, or a fixed value may be set and used for the terminal.

According to an embodiment, the threshold value may be set to be a fixed value for the terminal.

According to another embodiment, the threshold value may be variously set by the base station. The base station sets a threshold value, and periodically provides information on the set threshold value to the terminal as illustrated in FIG. 11. According to the condition of a scheduler of the base station, the terminal receives the threshold value, and applies the value to a beam selection and feedback operation.

To provide the threshold value, the base station may use a DMG beam refinement element format defined in the IEEE 802.11ad standard (WiGig) as illustrated in FIGS. 14A and 14B. 2 bits of the reserved region 710 provided in the format of FIG. 14A may be used as the region (Diff. Threshold) 712 for providing the threshold value as illustrated in FIG. 14B. The terminal maps the threshold value received from the base station to a defined value, and may use the same for a comparison operation.

For example, the threshold value may be set as four levels (00, 01, 10, 11). In this instance, information on the threshold value may be provided using the format of FIG. 14B.

As another example, the threshold value may be set as eight levels (000, 001, 010, 011, 100, 101, 110, 111) as illustrated in FIG. 12.

In a similar manner as the case of setting the number (or the ratio) of candidates, the base station may set the threshold value by determining power or interference and quality of channel, and transmit the set threshold value to the terminal.

The fact that the threshold value is set to be low indicates that the difference between an existing channel capacity and a current channel capacity is low. In this instance, a difference in CQI values is also negligible and thus, the terminal may omit calculation of CQI and feedback thereof.

Conversely, the fact that the threshold value is set to be high indicates that a channel condition is poor. A change in a CQI value which is a reference of the quality of channel, and a change in an SINR which is an index of the amount of interference coming from a neighboring antenna or the like are continuously monitored. When the CQI value continuously decreases and the amount of interference continuously increases, the channel condition becomes poor. In this instance, a best beam, a CQI value, an SINR value, or the like vary and thus, the base station makes the terminal calculate CQI and to feed the same back to the base station.

According to embodiments of the present disclosure, whether to feed CQI back may be determined based on the threshold value, and CQI feedback overhead may be reduced depending on situations. FIG. 12 indicates an example value when the threshold value is allocated based on three bits. A total of 8 threshold value levels may be set. In FIG. 12, a difference in channel capacities is expressed as 8 levels in units of 0.5 from 0.5 to 4. When the base station sets a channel capacity difference to be less than or equal to 2 (011) and sends the same to the terminal, the terminal may not feed a CQI value back to the base station.

(Operation 7) the terminal determines whether the difference in the channel capacities between the new beam combination and the existing best beam combination is less than the threshold value (operation S335 of FIG. 8 and operation S435 of FIG. 9). This operation is the secondary filtering process in which the terminal selects the existing best beam when the difference is less than the threshold value.

The terminal selects the existing best beam (operation S340 of FIG. 8 and operation S440 of FIG. 9). Also, based on the selection result, the terminal sets a beam flag bit (0 or 1) as beam change indication information in order to inform that the new best beam is identical to the existing best beam and whether a beam change is included in the new best beam, and transmits the corresponding beam change indication information (operation S345 of FIG. 8 and operation S445 of FIG. 9). For example, when the beam change does not exist, the beam flag bit may be set to (0). In this instance, the beam same as the exiting beam is to be used, whereby separate reporting of beam information (or index) for each antenna of the base station may not be needed. In this instance, only a beam flag of 1 bit, which indicates whether a beam index is changed, is used, whereby the amount of feedback information is dramatically reduced.

Figure 15A:
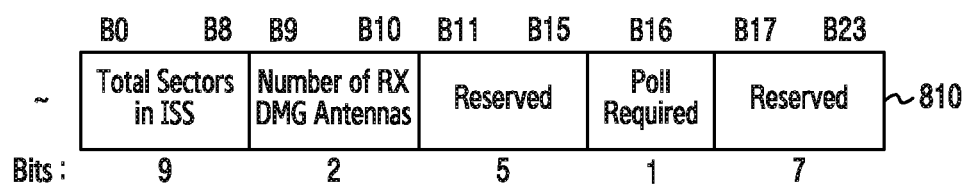
FIGS. 15A and 15B are diagrams illustrating the configuration of beam change indication information according to an embodiment of the present disclosure.
Figure 15B:
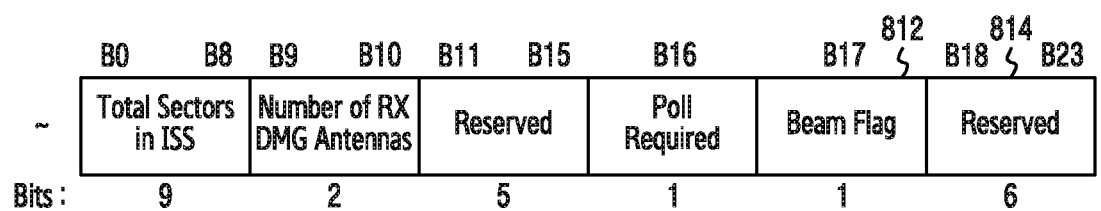
Figure 16A:
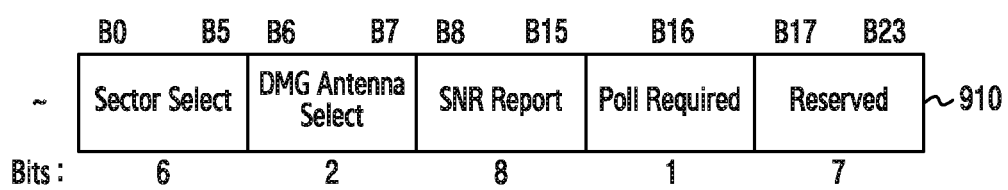
FIGS. 16A and 16B are diagrams illustrating the configuration of beam change indication information according to another embodiment of the present disclosure.
Figure 16B:
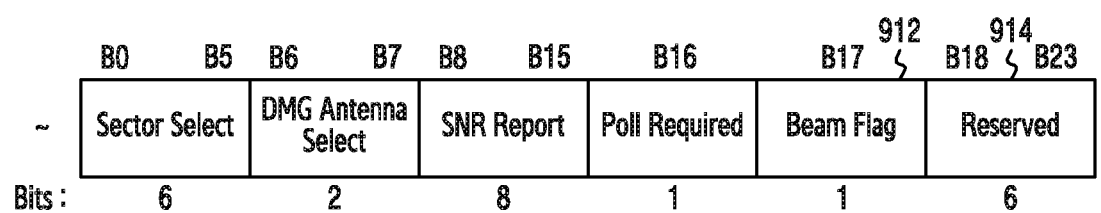
Figure 17A:
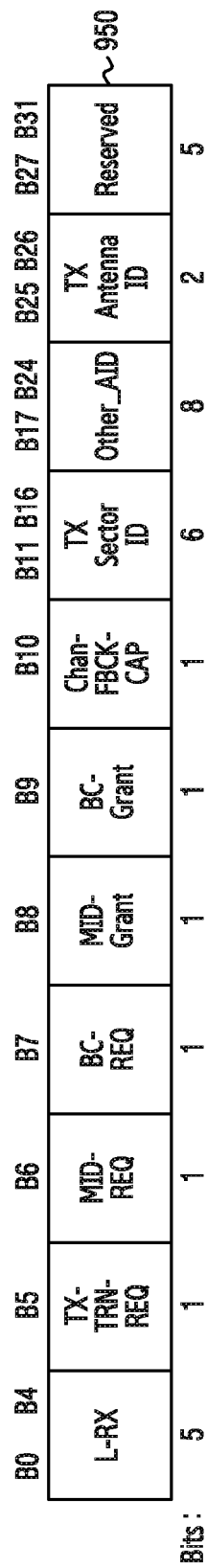
FIGS. 17A and 17B are diagrams illustrating the configuration of beam change indication information according to another embodiment of the present disclosure.
Figure 17B:
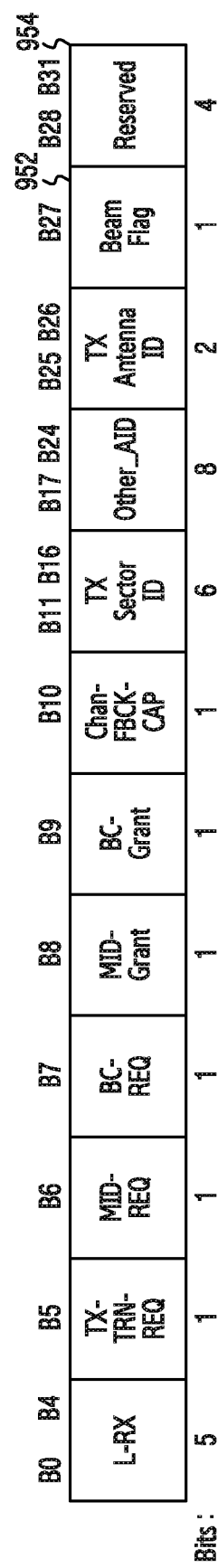

For the beam flag bit (0 or 1) as the beam change indication information, the formats illustrated in FIGS. 15B, 16B, and 17B may be used.

Referring to FIG. 15B, 1 bit in a reserved region 810 of a sector sweep (SSW) feedback field used for indicating a beam of a base station antenna defined in the IEEE 802.11ad (WiGig) standard of FIG. 15A may be used as a beam flag bit 812.

Referring to FIG. 16B, 1 bit in a reserved region 910 of a sector sweep (SSW) feedback field used for indicating a beam of a base station antenna defined in the IEEE 802.11ad (WiGig) standard of FIG. 16A may be used as a beam flag bit 912.

Referring to FIG. 17B, 1 bit in a reserved region 950 of a beam refinement protocol request field format defined in the IEEE 802.11ad (WiGig) standard of FIG. 17A may be used as a beam flag bit 952.

(Operation 8) the terminal performs the following method when the existing best beam combination is not included in the k candidates in the primary filtering of (operation 3) or when the difference in channel capacities between the new beam combination and the existing best beam combination is greater than the threshold value in the secondary filtering (operation 7).

According to an embodiment, the terminal selects a beam combination having the maximum power value from among k beam combinations (operation S450 of FIG. 9). The terminal sets a beam flag bit as beam change indication information based on the selection result, and feed back the beam information for each antenna of the base station to the base station (operation S455).

According to another embodiment, the terminal calculates channel capacities of all of the k beam combinations (operation S350 of FIG. 8), performs rearrangement through the calculation, and selects a beam combination having the maximum channel capacity (operation S355). The terminal sets a beam flag bit as beam change indication information based on the selection result, and feeds back the beam information for each antenna of the base station to the base station (operation S360).

As described above, operations according to embodiments of the present disclosure includes: setting candidates for selecting a best beam in a MIMO system supporting beamforming; comparing whether an existing beam is included in the newly obtained beam candidates; comparing a difference in channel capacities between the new beam and the existing beam, and controlling the amount of feedback information based on the comparison result. The operation may minimize the amount of the feedback information, whereby optimal performance may be maintained.

Also, according to embodiments of the present disclosure, a base station sets a threshold value for comparison with a difference between a new beam and an existing beam, based on scheduling, a channel environment, or the like, and periodically transmits the same to a terminal, whereby the threshold value is flexibly operated based on various situations.

Also, according to embodiments of the present disclosure, the terminal includes only a beam flag bit in a reserved region of a current WiGig (IEEE 802.11ad) frame format, as feedback information, and transmits the same. Also, the base station informs a threshold value to the terminal using the reserved region of the WiGig (IEEE 802.11ad) frame format.

Also, according to embodiments of the present disclosure, the terminal selects a beam from k beams set as beam candidates through exception handling or selects a rearranged beam combination through a method using channel capacities of k beam candidates or a method equivalent thereto, and transmits the same together with a beam flag bit through a feedback device.

According to embodiments of the present disclosure, complexity and feedback information processing calculation time are minimized by setting candidates and performing comparison with an existing best beam when an operation of selecting a best beam that maximizes channel capacity is performed, instead of a sub-optimal beam selection scheme.

Also, according to embodiments of the present disclosure, overhead is minimized by setting a flag bit for a beam number, and feeding back only 1-flag bit instead of transmitting beam numbers of each antenna when an existing beam is reused.

Also, according to embodiments of the present disclosure, and inter-beam handover is performed in an immediately subsequent frame or subframe while latency time for scheduling such as beam/resource allocation or the like is minimized even in the situation in which a wireless beamforming MIMO system having mobility, that is, a channel, promptly changes, whereby performance deterioration of a wireless communication link may be avoided and a stable data rate may be provided to a user equipment.

Also, as the number of antennas in the transmission and reception sides increases, and the number of terminals within a cell increases, the amount of feedback information associated with a beam number increases. However, embodiments of the present disclosure can minimize feedback overhead depending on situations, and may be applied to the currently used WiGig (IEEE 802.11ad) standard, without a significant modification.

Although the present disclosure has been described by the restricted embodiments and the drawings as described above, the present disclosure is not limited to the aforementioned embodiments, and various modifications and alterations can be made from the descriptions by those skilled in the art to which the present disclosure pertains.

Particular aspects of the present disclosure may be implemented as a computer-readable code in a computer-readable recording medium. The computer-readable recording medium may be any data storage device which can store data readable by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method performed by a receiving device in a wireless communication system, the method comprising:
identifying beam pair candidates from among a plurality of transmission/reception beam pairs, wherein the beam pair candidates include a previous beam pair selected in a previous beamforming procedure;
determining a difference in channel capacity values between a beam pair having a maximum power value from among the beam pair candidates and the previous beam pair;
selecting at least one beam pair based on a result of comparing the difference and a predetermined threshold value; and
transmitting feedback information including beam change indication information based on a comparison of the at least one beam pair and the previous beam pair.

2. The method of claim 1, wherein the transmitting the feedback information comprises:
when the previous beam pair is identical to the at least one beam pair, transmitting the feedback information including beam change indication information indicating that beams are not changed.

3. The method of claim 1, wherein the transmitting the feedback information comprises:
when the previous beam pair is different from the at least one beam pair, transmitting the feedback information including beam change indication information indicating that beams are changed and information on the at least one beam pair.

4. The method of claim 1, wherein the selecting the at least one beam pair comprises:
when the difference is less than the predetermined threshold value, selecting the previous beam pair as the at least one beam pair.

5. The method of claim 1, wherein the selecting the at least one beam pair comprises:
when the difference is greater than or equal to the predetermined threshold value, selecting a beam pair having a maximum channel capacity value from among beam pairs included in the pair beam candidates as the at least one beam pair.

6. The method of claim 1, wherein the selecting the at least one beam pair comprises:
when the difference is greater than or equal to the predetermined threshold value, selecting a beam pair having a maximum power value from among beam pairs included in the beam pair candidates, as the at least one beam pair.

7. A method performed by a transmitting device in a wireless communication system, the method comprising:
receiving feedback information including beam change indication information based on a comparison of at least one beam pair selected from beam pair candidates among a plurality of transmission/reception beam pairs,
wherein the beam pair candidates include a previous beam pair selected in a previous beamforming procedure,
wherein, when the previous beam pair is included in beam pair candidates including a predetermined number of beam pairs from among the plurality of transmission/reception beam pairs, the at least one beam pair is selected based on a result of comparing a predetermined threshold value and a difference in channel capacity values between a beam pair having a maximum power value from among the beam pair candidates and the previous beam pair.

8. The method of claim 7, wherein the receiving the feedback information comprises:
when the previous beam pair is identical to the at least one beam pair, receiving the feedback information including beam change indication information indicating that beams are not changed.

9. The method of claim 7, wherein the receiving the feedback information comprises:
when the previous beam pair is different from the at least one beam pair, receiving the feedback information including beam change indication information indicating that beams are changed, and information on the at least one beam pair.

10. The method of claim 7, wherein, when the difference is less than the predetermined threshold value, the previous beam pair is selected as the at least one beam pair.

11. The method of claim 7, wherein, when the difference is greater than or equal to the predetermined threshold value, selecting a beam pair having a maximum channel capacity value from among beam pairs included in the beam pair candidates as the at least one beam pair.

12. A device in a wireless communication system, the device comprising:
a transceiver; and
at least one processor operably coupled to the transceiver, wherein the at least one processor is configured to:
identify beam pair candidates from among a plurality of transmission/reception beam pairs, wherein the beam pair candidates include a previous beam pair selected in a previous beamforming procedure,
determine a difference in channel capacity values between a beam pair having a maximum power value from among the beam pair candidates and the previous beam pair,
select at least one beam pair based on a result of comparing the difference and a predetermined threshold value, and
transmit feedback information including beam change indication information based on a comparison of the at least one beam pair and the previous beam pair.

13. The device of claim 12, wherein the at least one processor is further configured to:
when the previous beam pair is identical to the at least one beam pair, control the transceiver to transmit the feedback information including beam change indication information indicating that beams are not changed.

14. The device of claim 12, wherein the at least one processor is further configured to:

when the previous beam pair is different from the at least one beam pair, control the transceiver to transmit the feedback information including beam change indication information indicating that beams are changed and information on the at least one beam pair.

15. The device of claim 12, wherein the at least one processor is further configured to:

when the difference is less than the predetermined threshold value, select the previous beam pair as the at least one beam pair.

16. The device of claim 12, wherein the at least one processor is further configured to:

when the difference is greater than or equal to the predetermined threshold value, select a beam pair having a maximum channel capacity value from among beam pairs included in the beam pair candidates as the at least one beam pair.

17. The device of claim 12, wherein the at least one processor is further configured to:

when the difference is greater than or equal to the predetermined threshold value, select a beam pair having a maximum power value from among beam pairs included in the beam pair candidates, as the at least one beam pair.

18. The method of claim 1, wherein the beam pair candidates are identified based on at least one of a predetermined number of beam pairs or a predetermined ratio of the beam pairs.

19. The method of claim 18, wherein the beam pair candidates are identified based on a maximum power value within a predefined number from among the plurality of the transmission/reception beam pairs.

20. The method of claim 18, wherein the beam pair candidates are identified based on a maximum power value within a predefined ratio from among the plurality of the transmission/reception beam pairs.

* * * * *